(12) United States Patent
Burstrom et al.

(10) Patent No.: US 12,496,794 B2
(45) Date of Patent: Dec. 16, 2025

(54) METHOD IN A PRESSING ARRANGEMENT

(71) Applicant: Quintus Technologies AB, Vasteras (SE)

(72) Inventors: Per Burstrom, Vasteras (SE); Emil Holmstrom, Vasteras (SE)

(73) Assignee: Quintus Technologies AB, Vasteras (SE)

( * ) Notice: Subject to any disclaimer, the term of this patent is extended or adjusted under 35 U.S.C. 154(b) by 820 days.

(21) Appl. No.: 17/637,653

(22) PCT Filed: Sep. 6, 2019

(86) PCT No.: PCT/EP2019/073867
§ 371 (c)(1),
(2) Date: Feb. 23, 2022

(87) PCT Pub. No.: WO2021/043422
PCT Pub. Date: Mar. 11, 2021

(65) Prior Publication Data
US 2022/0274365 A1    Sep. 1, 2022

(51) Int. Cl.
*B30B 11/00*     (2006.01)
*B30B 15/34*     (2006.01)

(52) U.S. Cl.
CPC .......... *B30B 11/002* (2013.01); *B30B 11/005* (2013.01); *B30B 15/34* (2013.01)

(58) Field of Classification Search
CPC ..... B30B 11/002; B30B 11/005; B30B 15/34; B30B 11/001
See application file for complete search history.

(56) References Cited

U.S. PATENT DOCUMENTS 5,816,090 A    10/1998    Hodge et al.
6,514,066 B1    2/2003    Bergman
(Continued)

FOREIGN PATENT DOCUMENTS

CN    1114248 A    1/1996
CN    1794126 A    6/2006
(Continued)

OTHER PUBLICATIONS

Decision of Patent, dated Oct. 24, 2023, issued in corresponding Japanese Patent Application No. 2022-513947.
(Continued)

*Primary Examiner* — Rebecca Janssen
(74) *Attorney, Agent, or Firm* — Harness, Dickey & Pierce, P.L.C.

(57) ABSTRACT

Pressing arrangement (100) comprising a pressure vessel (1, 16, 17) and a furnace chamber (18) arranged therein defining a treatment region for an article (5), the treatment cycle including a cooling phase. The pressing arrangement (100) comprises a fan (35) configured to circulate a pressurised gas within the pressure vessel (1, 16, 17) and a heating device (36) for heating the pressurised gas in the treatment region. It further comprises a control and processing module (6) configured to, during the cooling phase: obtain temperature values in the treatment region; based on these values, determine a cooling power for cooling of the pressurised gas in the treatment region; determine a difference between a cooling power required to obtain a selected value of cooling rate of the pressurised gas and the determined cooling power; and based on this difference, control the fan's (35) rotational speed so as to make the difference decrease. If the cooling power provided by the operation of the fan (35) exceeds a cooling power corresponding to the desired cooling rate of the pressurised gas, the control module (6) is (Continued)

configured to, based on the determined difference, heat the pressurised gas using the heating device (36) to make the difference decrease.

20 Claims, 4 Drawing Sheets

(56) References Cited

U.S. PATENT DOCUMENTS

| | | | | |
|---|---|---|---|---|
| 2003/0215539 | A1* | 11/2003 | Manabe | F27D 7/06 |
| | | | | 425/405.2 |
| 2007/0228596 | A1 | 10/2007 | Fujikawa et al. | |
| 2013/0337395 | A1* | 12/2013 | Gardin | F27D 7/04 |
| | | | | 432/233 |
| 2014/0272745 | A1* | 9/2014 | Gardin | B22F 3/15 |
| | | | | 432/24 |

FOREIGN PATENT DOCUMENTS

| | | |
|---|---|---|
| CN | 101909789 A | 12/2010 |
| CN | 102907181 A | 1/2013 |
| CN | 103009659 A | 4/2013 |
| CN | 103249549 A | 8/2013 |
| CN | 103691945 A | 4/2014 |
| CN | 105378415 A | 3/2016 |
| CN | 105562694 A | 5/2016 |
| CN | 207577421 U | 7/2018 |
| DE | 102007023703 A1 | 11/2008 |
| JP | S63197876 A | 8/1988 |
| JP | H01230984 A | 9/1989 |
| JP | H03-127197 U | 12/1991 |
| JP | H04240389 A | 8/1992 |
| JP | H05140614 A | 6/1993 |
| JP | 3233295 B2 | 11/2001 |
| JP | 2003-336972 A | 11/2003 |
| JP | 2007-263463 A | 10/2007 |
| JP | 2021-516618 A | 7/2021 |
| RU | 2302924 C2 | 7/2007 |
| RU | 2427449 C1 | 8/2011 |
| WO | WO-03/070402 A1 | 8/2003 |
| WO | WO-2018/219444 A1 | 12/2018 |
| WO | WO-2019/149377 A1 | 8/2019 |
| WO | WO-2019/149379 A1 | 8/2019 |
| WO | WO-2020/151832 A1 | 7/2020 |

OTHER PUBLICATIONS

International Preliminary Report on Patentability for International Application No. PCT/EP2019/073867 dated Dec. 13, 2021.
Written Opinion for International Application No. PCT/EP2019/073867 dated Sep. 28, 2021.
International Search Report for International Application No. PCT/EP2019/073867 dated May 27, 2020.
Anonymous: "Hot Isostatic Pressing Equipment—Hot Isostatic Pressing", Aug. 27, 2019 (Aug. 27, 2019), XP055827194, Retrieved from the Internet: URL: http://ipa-web.org/about-ip/hip-equipment.html [retrieved on Jul. 23, 2021].
Chinese Office Action dated Jan. 30, 2024 issued in corresponding Chinese Patent Application No. 201980100019.4 (with partial English translation).
Russian Office Action dated Jan. 20, 2023 issued in corresponding Russian Appln. No. 2022108548.
Japanese Office Action, dated Jun. 20, 2023, issued in corresponding Japanese Patent Application No. 2022-513947.

* cited by examiner

METHOD IN A PRESSING ARRANGEMENT

CROSS-REFERENCE TO RELATED APPLICATIONS

This application is a national phase under 35 U.S.C. § 371 of PCT International Application No. PCT/EP2019/073867 which has an International filing date of Sep. 6, 2019, the entire contents of each of which are hereby incorporated by reference.

TECHNICAL FIELD

The present invention generally relates to the field of high-pressure technology, in particular pressure treatment. More specifically, the present invention relates to a method for controlling a cooling rate in a pressing arrangement, the pressing arrangement being arranged for treatment of an article for example by means of hot pressing, such as hot isostatic pressing (HIP). By means of the method, cooling of treated articles in a controlled fashion may be facilitated or enabled.

BACKGROUND

Hot isostatic pressing (HIP) employs a pressure medium in form of a pressurized heated gas to achieve for example consolidation, densification, or bonding of high performance components and materials. HIP may for example be used for reducing or even eliminating porosity in processed articles, achieving 100% of maximum theoretical density in process articles such as castings (e.g., turbine blades), resulting in exceptional resistance to fatigue, impact, wear and abrasion. HIP may in addition be used in manufacturing of products by means of compressing powder (which may be referred to as powder metallurgy HIP, or PM HIP), which products are desired or required to be fully, or substantially fully, dense, and to have pore-free, or substantially pore-free, outer surfaces, etc. The products obtained from HIP processing may for example be used in airplane bodies, aviation engines, car engines, human-body implants, and in the offshore industry, just to mention a few applications. HIP provides many benefits and has become a viable and high performance alternative and/or complement to conventional processes such as forging, casting and machining. An article to be subjected to pressure treatment by HIP may be positioned in a load compartment or chamber of a thermally insulated pressure vessel. A treatment cycle may comprise loading the article, treating the article, and unloading the article. Several articles may be treated simultaneously. The treatment cycle may be divided into several parts, or phases, such as a pressing phase, a heating phase, and a cooling phase. After loading an article into the pressure vessel, it may then be sealed, followed by introduction of a pressure medium (e.g., comprising an inert gas such as Argon-containing gas) into the pressure vessel and the load compartment thereof. The pressure and temperature of the pressure medium is then increased, such that the article is subjected to an increased pressure and an increased temperature during a selected period of time. The increase in temperature of the pressure medium, which in turn may cause an increase in temperature of the article, is provided by means of a heating element or furnace arranged in a furnace chamber of the pressure vessel. The pressures, temperatures and treatment times may for example depend on the desired or required material properties of the treated article, the particular field of application, and the required quality of the treated article. Pressures in HIP may for example be in the range from 200 bar to 5000 bar, such as from 800 bar to 2000 bar. Temperatures in HIP may for example be in the range from 300° C. to 3000° C., such as from 800° C. to 2000° C.

When the pressure treatment of the article is finished, the article may need to be cooled before being removed, or unloaded, from the pressure vessel. Characteristics of the cooling—for example the rate thereof—of the article may affect the metallurgical properties of the treated article. It is generally desired to be able to cool an article in a homogeneous manner, and also, if possible, to be able to control the cooling rate. Efforts have been made to reduce the period of time required for cooling of an article subjected to HIP. For example, during cooling phase, it may be required or desired to decrease the temperature of the pressure medium (and thereby of the article) rapidly without causing any large temperature variations within the load compartment (e.g., so that the temperature within the load compartment is reduced in a uniform manner) in a controlled manner, and to maintain the temperature at a certain temperature level or within a certain temperature range during a selected period of time with no or only small fluctuations in temperature during the selected period of time. By not having any large mean temperature variations within the load compartment during cooling of an article, there may be no or only very small temperature variations within different portions of the article during the cooling thereof. Thereby, internal stresses in the treated article may be reduced.

SUMMARY

While efforts have been made to increase the cooling rate in HIP, the inventors have realized that it would be advantageous to be able to control the cooling rate in HIP with a relatively high flexibility so as to be able to adapt the cooling rate to different requirements or situations, which for example may further facilitate reducing or removing temperature variations within different portions of the treated article during the cooling thereof, especially when a relatively low cooling rate is desired or required, which may be beneficial in reducing internal stresses in the treated article.

In view of the above, a concern of the present invention is to provide a method in a pressing arrangement such as a pressing arrangement for HIP, which method may be used for controlling a cooling rate in a pressing arrangement such as a pressing arrangement for HIP, and which method may facilitate or allow for controlling the cooling rate in the pressing arrangement with a relatively high flexibility so as to be able to adapt the cooling rate to different requirements or situations.

Another concern of the present invention is to provide a method in a pressing arrangement such as a pressing arrangement for HIP, which method may be used for controlling a cooling rate in a pressing arrangement such as a pressing arrangement for HIP, and which method may facilitate or allow for achieving or obtaining a selected rate of cooling of the pressure medium in the pressing arrangement, e.g., in a treatment region arranged to accommodate the treated article, that is within a relatively large rate range, e.g., over a period of time, and possibly with a relatively high precision.

Another concern of the present invention is to provide a method in a pressing arrangement such as a pressing arrangement for HIP, which method may be used for controlling a cooling rate in a pressing arrangement such as a pressing arrangement for HIP, and which method may facilitate or allow for achieving a relatively even or uniform temperature distribution in the pressing arrangement, e.g. in the treatment region or in a furnace chamber defining the treatment region, possibly relatively quickly, when desired or required.

To address at least one of these concerns and other concerns, a method in a pressing arrangement and a pressing arrangement in accordance with the independent claims are provided. Preferred embodiments are defined by the dependent claims.

According to a first aspect there is provided a method in a pressing arrangement.

The pressing arrangement comprises a pressure vessel, which is arranged to hold pressure medium therein during use of the pressing arrangement. The pressing arrangement comprises a furnace chamber, which is arranged within the pressure vessel, and which is arranged so that pressure medium can enter and exit the furnace chamber. A treatment region is at least in part defined by the furnace chamber, wherein the treatment region is arranged to accommodate an article. The pressing arrangement is configured to subject the article to a treatment cycle including a cooling phase. The pressing arrangement comprises a pressure medium heating device configured to selectively and controllably heat the pressure medium within the pressure vessel for increasing the temperature of the pressure medium in the treatment region. The pressing arrangement comprises a pressure medium circulation flow generator, which is configured to provide a circulation of pressure medium within the pressure vessel, wherein during the circulation of the pressure medium the pressure medium passes through the furnace chamber. The pressure medium circulation flow generator is controllable at least with respect to operating rate thereof.

The method according to the first aspect is for controlling the rate of cooling of the pressure medium in the treatment region. The method comprises, during the cooling phase, obtaining values indicative of at least one temperature in the treatment region at a plurality of time instants, and based on the obtained values, determining a cooling power for cooling of the pressure medium in the treatment region, and determining a difference between a required cooling power required to obtain a selected value for the rate of cooling of the pressure medium in the treatment region and the determined cooling power. The method comprises, based on the determined difference, controlling the operating rate of the pressure medium circulation flow generator so that a difference between the cooling power for cooling of the pressure medium in the treatment region and the required cooling power decreases. If the cooling power for cooling of the pressure medium in the treatment region provided by the operation of the pressure medium circulation flow generator exceeds a cooling power corresponding to the selected value for the rate of cooling of the pressure medium in the treatment region, the pressure medium in the treatment region is heated based on the determined difference using the pressure medium heating device so that a difference between the cooling power of cooling of the pressure medium in the treatment region and the required cooling power decreases.

The method according to the first aspect facilitates controlling the rate of cooling of the pressure medium in the treatment region with a relatively high flexibility, so as to be able to adapt the cooling rate to different requirements or situations.

In some cases, a relatively low rate of cooling of the pressure medium in the treatment region may be desired or even required at least momentarily or during some period of time, during a cooling phase. For example, it may be desired or even required to achieve a rate of cooling of the pressure medium in the treatment region that is close to and/or possibly below a "natural" rate of cooling of the pressure medium in the treatment region. The method according to the first aspect may be particularly advantageous in such cases. That is, the method according to the first aspect may be particularly advantageous in cases where the above-mentioned selected value for the rate of cooling of the pressure medium in the treatment region is relatively low, possibly close to and/or below the "natural" rate of cooling of the pressure medium in the treatment region.

In accordance with the method according to the first aspect, during the cooling phase, the operating rate of the pressure medium circulation flow generator is controlled so that a difference between the cooling power for cooling of the pressure medium in the treatment region and the required cooling power decreases. It has been found by the inventors that by means of the operation of the pressure medium circulation flow generator during the cooling phase, it may be facilitated to achieve a relatively even or uniform temperature distribution e.g. in the treatment region or in the furnace chamber during the cooling phase.

During the circulation of the pressure medium the pressure medium that passes through the furnace chamber effected by the pressure medium circulation flow generator, the circulation of the pressure medium may pass through the treatment region. Thus, by the circulation of pressure medium within the pressure vessel by the pressure medium circulation flow generator, the temperature of the pressure medium in the treatment region may be decreased by convection, e.g., by relatively warm pressure medium in the treatment region being transported away from the treatment region, for example to or towards regions outside the furnace chamber such as regions in proximity to inner surfaces of the pressure vessel walls.

The pressure medium circulation flow generator may for example be configured to provide a circulation of pressure medium in an inner convection loop within the pressure vessel. The treatment region may for example be defined by a load compartment within the furnace chamber. The furnace chamber may be at least partly enclosed by a heat insulated casing and arranged so that pressure medium can enter and exit the furnace chamber. The furnace chamber may comprise at least one pressure medium guiding passage, which may be at least in part formed between the heat insulated casing and the load compartment and which may be in fluid communication with the load compartment so as to form an inner convection loop, wherein pressure medium in the inner convection loop is guided through the load compartment and through the at least one pressure medium guiding passage of the furnace chamber and back to the load compartment, or vice versa. The pressure medium circulation flow generator may be configured to provide a circulation of pressure medium in such an inner convection loop.

Further in accordance with the method according to the first aspect, if the cooling power for cooling of the pressure medium in the treatment region that is provided by the operation of the pressure medium circulation flow generator is exceeding a cooling power that corresponds to the selected value for the rate of cooling of the pressure medium in the treatment region, the pressure medium in the treatment region is heated based on the determined difference using the pressure medium heating device so that a difference between the cooling power of cooling of the pressure medium in the treatment region and the required cooling power decreases. This may be carried out concurrently with the operation of the pressure medium circulation flow generator, as described above. This may be particularly advantageous in cases where the above-mentioned selected value for the rate of cooling of the pressure medium in the treatment region is relatively low, possibly close to and/or below the "natural" rate of cooling of the pressure medium in the treatment region. It has been found by the inventors that by means of a conditional heating of the pressure medium in the treatment region as described above, it may be facilitated to achieve a relatively even or uniform temperature distribution e.g. in the treatment region or in the furnace chamber during the cooling phase while at the same facilitating or allowing for achieving a rate of cooling of the pressure medium in the treatment region that is relatively low. By means of a conditional heating of the pressure medium in the treatment region as described above, thermal energy may be selectively and controllably introduced in the treatment region, during the cooling phase. By controllably introducing thermal energy in the pressure vessel during the cooling phase, the cooling rate may decrease.

In the context of the present application, by a cooling power for cooling of the pressure medium in the treatment region (or in another region in the pressure vessel), it is meant the thermal power dissipated from the treatment region (or other region) per unit of time. Accordingly, by a required cooling power required to obtain a selected value for the rate of cooling of the pressure medium in the treatment region (or other region), it is meant the thermal power required to be dissipated from the treatment region (or other region) per unit of time in order to obtain a selected value for the rate of cooling of the pressure medium in the treatment region (or other region). Given a desired or required rate of cooling of the pressure medium in the treatment region (or other region), the required cooling power may be determined based on the so called thermal mass of, e.g., the pressure medium (e.g., in the treatment region or furnace chamber), the furnace chamber, and the article(s), and the desired or required rate of cooling. For example, the required cooling power may be determined as a product of the thermal mass (of, e.g., the pressure medium, the furnace chamber, and the article(s)) and the desired or required rate of cooling, and possibly some predefined or selected constant. The concept of thermal mass is known in the art.

A cooling power for cooling of the pressure medium in the treatment region may be determined based on at least one temperature in the treatment region at a plurality of time instants, as mentioned in the foregoing. The cooling power for cooling of the pressure medium in the treatment region may for example be determined based on at least one of a temperature change rate in the treatment region, and the thermal mass of, e.g., the pressure medium (e.g., in the treatment region or furnace chamber), the furnace chamber, and the article(s). The cooling power for cooling of the pressure medium in the treatment region may be determined further based on another or other quantities, such as pressure within the pressure vessel, such as pressure within the treatment region or furnace chamber. To that end, there may be one or more pressure sensors arranged within the pressure vessel.

A cooling power for cooling of the pressure medium in the treatment region may refer to a cooling power for cooling of a load in the treatment region, with the load including the article(s), the pressure medium in the treatment region, and possibly the furnace chamber.

In the context of the present application, by a "natural" rate of cooling of the pressure medium in the treatment region, it is meant a rate of cooling of the pressure medium in the treatment region that corresponds to a rate of cooling of the pressure medium in the treatment region that would result if the pressure vessel would be allowed to cool without any active means for cooling the pressure vessel, such as by natural convection and radiation.

A relatively even or uniform temperature distribution in the treatment region or within the furnace chamber may be beneficial in that the articles(s) subjected to the processing or treatment in the pressing arrangement may have less or possibly even no temperature variation within the article(s), which may facilitate reducing any internal stresses in the article(s). Achieving a relatively even or uniform temperature distribution in the treatment region or within the furnace chamber may be particularly advantageous in case the treatment region or furnace chamber is relatively large, and may reduce the risk or even avoid that articles which are spaced apart in the treatment region are processed differently. Achieving a relatively even or uniform temperature distribution in the treatment region or within the furnace chamber may further facilitate achieving a desired phase of the material(s) in the article(s), and/or achieving a desired structure of different parts or portions (e.g., layers) of the material(s) in the article(s), for example by way of controlling operation of the pressing arrangement in accordance with a continuous cooling transformation (CCT) phase diagram. CCT phase diagrams are as such known in the art.

As per the previous description, the treatment region may for example be at least in part defined by a furnace chamber, which may be comprised in the pressing arrangement. For example, the treatment region may be comprised in or constituted by an interior of a furnace chamber, which may be comprised in the pressing arrangement. The furnace chamber may be arranged within the pressure vessel. The furnace chamber may be at least partly enclosed by a heat insulated casing and arranged so that pressure medium can enter and exit the furnace chamber, wherein, as mentioned, the treatment region may be comprised or constituted by an interior of the furnace chamber.

The obtaining of values indicative of at least one temperature within the treatment region at a plurality of time instants may comprise sensing at least one temperature within the treatment region at a plurality of time instants. This sensing and any other sensing of temperature in the pressure vessel or possibly elsewhere in the pressing arrangement may for example be done by means of a thermometer, a thermocouple and/or another type of temperature sensor or device suitable for sensing temperature. In alternative, or in addition, the obtaining of values of at least one temperature within the treatment region at a plurality of time instants may comprise receiving the value(s) from a component or element that for example may be included in the pressing arrangement. As will be described further in the following, the method may for example be implemented in a control and processing unit, in which case the obtaining of values of at least one temperature within the treatment region at a plurality of time instants may comprise the control and processing unit receiving the value(s) from, e.g., a thermometer, a thermocouple and/or another type of temperature sensor or device suitable for sensing temperature.

Sensing at least one temperature in the pressure vessel and/or at least one temperature within the treatment region at a plurality of time instants may for example be carried out by means of at least one sensor which may be arranged within the pressure vessel or treatment region, respectively. However, in alternative or in addition, the at least one sensor could be arranged not in the treatment region but elsewhere within the pressure vessel. For example in such a case, the at least one sensor could possibly be configured to sense at least one temperature in the vicinity of the treatment region, and based thereon, at least one temperature in the treatment region, possibly at a plurality of time instants, could be derived. For example, the at least one sensor could be configured to sense thermal expansion of a part or portion of the pressing arrangement in the vicinity of the treatment region, and based on the sensed thermal expansion, at least one temperature in the treatment region, possibly at a plurality of time instants, could be derived.

The pressing arrangement may comprise a pressure medium supplying device. The pressure medium supplying device may be configured to selectively and controllably transport pressure medium during the cooling phase from another region in the pressing arrangement to the treatment region, wherein the temperature of the pressure medium in the other region is lower than the temperature of the pressure medium in the treatment region during at least part of the cooling phase for decreasing the temperature of the pressure medium in the treatment region by transport of pressure medium during the cooling phase from the other region to the treatment region. The pressure medium supplying device may be controllable at least with respect to pressure medium supplying rate. If the maximally possible cooling power for cooling of the pressure medium in the treatment region provided by the operation of the pressure medium circulation flow generator is below a cooling power corresponding to the selected value for the rate of cooling of the pressure medium in the treatment region, the pressure medium supplying rate of the pressure medium supplying device may be controlled based on the determined difference so that a difference between the cooling power for cooling of the pressure medium in the treatment region and the required cooling power decreases.

Thus, the rate of cooling of the pressure medium in the treatment region may be (further) controlled by means of transporting relatively cold pressure medium (that is "cold" in comparison to the pressure medium in the treatment region, or in the furnace chamber, and is of lower temperature than pressure medium in the treatment region, or in the furnace chamber) from the other region to the treatment region, using the pressure medium supplying device. The controlling of the pressure medium supplying rate of the pressure medium supplying device based on the determined difference so that a difference between the cooling power for cooling of the pressure medium in the treatment region and the required cooling power decreases may be carried out concurrently with the operation of the pressure medium circulation flow generator, as described above. It has been found by the inventors that by such controlling of the pressure medium supplying rate of the pressure medium supplying device, a selected rate of cooling of the pressure medium in the treatment region that is within a relatively large rate range, such as between (about) 0° C. per minute and (about), 1000° C. per minute or even more, may be achieved, e.g., over a selected period of time, and possibly with a relatively high precision.

It is to be noted that the functionality of the pressure medium supplying device may possibly be provided by the pressure medium circulation flow generator, or vice versa. Thus, there may possibly be one device, which may be referred to as pressure medium flow generator or a pressure medium circulation generator, that may be configured so as to provide both the functionality of the pressure medium supplying device as described herein and the functionality the pressure medium circulation flow generator as described herein.

The above-mentioned other region in the pressing arrangement may for example be defined by a region within the pressure vessel that is different and possibly at a distance from the treatment region. The above-mentioned other region must not necessarily be a region within the pressure vessel, but may be a region in the pressing arrangement outside the pressure vessel, such as, for example a region defined by a pressure medium source that is arranged outside the pressure vessel.

The pressing arrangement may comprise a plurality of pressure medium guiding passages in fluid communication with the furnace chamber and arranged to form an outer cooling loop within the pressure vessel. The pressure medium supplying device may be configured to transport pressure medium during the cooling phase from the outer cooling loop to the furnace chamber (or to the treatment region therein). The above-mentioned other region in the pressing arrangement may comprise at least a part of the outer cooling loop.

The pressure medium supplying device may for example comprise a pressure medium flow generator. The pressure medium flow generator may for example comprise a fan and/or a pump. For example, the controllable pressure medium supplying device may comprise a pressure medium flow generator constituted by or including at least one fan, wherein the at least one fan may have a controllable number of revolutions per minute (rpm), and the pressure medium supplying rate of the pressure medium supplying device may be controlled by means of controlling the rpm of the at least one fan.

In the foregoing and in the following reference is made to pressure medium flow generator(s) comprising or being constituted by one or more fans. It is to be understood that wherever reference is made herein to a fan (or several fans), the fan(s) could be replaced or supplemented with one or more pumps in the form of a fan, blower, compressor, etc.

The pressure medium heating device may for example comprise or be constituted by a furnace. The furnace may be comprised in the furnace chamber or be a part or portion of the furnace chamber.

The furnace may be configured such that by controlling the electrical power input into the furnace, the pressure medium within the furnace chamber can be controllably heated by the furnace. The heating of the pressure medium in the treatment region based on the above-mentioned determined difference may for example comprise controlling power input into the furnace based on the determined difference.

The furnace may for example comprise at least one electrical heating element. By controlling the power input into the at least one electrical heating element of the furnace, the pressure medium within the furnace chamber may be controllably heated by the at least one electrical heating element of the furnace. Thus, the heating of the pressure medium in the treatment region based on the above-mentioned determined difference may comprise controlling power input into the at least one electrical heating element based on the determined difference.

The treatment cycle may comprise loading the article in the pressing arrangement, treating the article, and unloading the article from the pressing arrangement. The treatment cycle in addition to the cooling phase comprise other parts or phases, such as a pressing phase and/or a heating phase (which possibly may be combined in one phase), which may precede the cooling phase.

The sequence of steps of the obtaining of values indicative of at least one temperature in the treatment region at a plurality of time instants, the determination of a cooling power for cooling of the pressure medium in the treatment region based on the obtained values, the determination of a difference between the required cooling power required to obtain the selected value for the rate of cooling of the pressure medium in the treatment region and the determined cooling power, and the controlling of the operating rate of the pressure medium circulation flow generator, the controlling of the pressure medium supplying rate of the pressure medium supplying device and/or the heating of the pressure medium in the treatment region using the pressure medium heating device based on the determined difference, may be carried out repeatedly.

The sequence of steps may for example be carried out repeatedly over a certain period of time. Each time the sequence of steps is carried out, values indicative of at least one temperature in the treatment region at different pluralities of time instants may be obtained. For example, the values indicative of at least one temperature in the treatment region obtained each time the sequence of steps is carried out may have been sensed at different pluralities of time instants.

The sequence of steps may for example be carried out repeatedly over a certain period of time for example so as to control the rate of cooling of the pressure medium in the treatment region to keep the rate of cooling of the pressure medium in the treatment region within a selected or predefined rate range or at a selected or predefined rate, e.g., over a period of time. Accordingly, the method may comprise or constitute a control loop mechanism for controlling the rate of cooling of the pressure medium in the treatment region to be within a predefined rate range or at a selected rate, e.g., over a period of time. The above-mentioned required cooling power, required to obtain a selected value for the rate of cooling of the pressure medium in the treatment region, may be referred to as a setpoint for the cooling power for cooling of the pressure medium in the treatment region. The predefined rate range may be referred to as a controllable cooling rate range. An upper limit (or upper endpoint) for the controllable cooling rate range may be determined based on a maximum achievable cooling power for the pressure medium in the treatment region (e.g., loss of thermal energy of the pressure medium in the treatment region per time unit), which may depend on the configuration of the pressing arrangement, such as the configuration of the furnace chamber which may define the treatment region. A lower limit (or lower endpoint) for the controllable cooling rate range may be determined in relation to a minimal available cooling power for the pressure medium in the treatment region, which may be determined by the "natural" rate of cooling of the pressure medium in the treatment region, e.g., when no active cooling of the pressure medium in the treatment region is carried out. The lower limit may be below the "natural" rate of cooling of the pressure medium in the treatment region, for example by means of employing the above-mentioned conditional heating of the pressure medium in the treatment region using the pressure medium heating device.

The pressure medium circulation flow generator may for example comprise a fan (or possibly several fans), which may have a controllable number of revolutions per minute (rpm). The operating rate of the pressure medium circulation flow generator may for example comprise the rpm.

For example if the determined cooling power exceeds a predefined cooling power threshold value during at least a predefined length of time, the rpm of the fan may be decreased by a selected percentage of the current rpm of the fan or to a selected value of the rpm of the fan during a selected period of time. In alternative or in addition, the decrease of the rpm of the fan by a selected percentage of the current rpm of the fan or to a selected value of the rpm of the fan during a selected period of time may be triggered based on another type of event or condition. By decreasing the rpm of the fan by a selected percentage of the current rpm of the fan or decreasing the rpm of the fan to a selected value of the rpm of the fan during a selected period of time, the temperature of the pressure medium in the treatment region can be brought relatively quickly to a desired temperature or within a desired temperature range (e.g., within a tolerance range for the temperature of the pressure medium in the treatment region). The decreasing of the rpm of the fan by a selected percentage of the current rpm of the fan or the decreasing the rpm of the fan to a selected value of the rpm of the fan may be carried out gradually and continuously (e.g., in a step-less fashion). By means of operation of the pressure medium circulation flow generator during the cooling phase as described in the foregoing, it may be facilitated to achieve a relatively even uniform temperature distribution e.g. in the treatment region or in the furnace chamber during the cooling phase. It is to be understood that the pressure medium circulation flow generator could possibly, in alternative or in addition to comprising a fan (or possibly several fans), comprise some other type of pressure medium flow generating device having one or more operating rates, which operating rate(s) could be adjusted similarly to the rpm of the fan as described in the foregoing.

According to another example, the rpm of the fan may be increased by a selected percentage of the current rpm of the fan or to a selected value of the rpm of the fan, e.g., during a period of time. The pressure medium in the treatment region may be heated using the pressure medium heating device so as maintain a temperature in the treatment region within a selected temperature range, e.g., over the period of time. Such actions may for example be carried out after a cooling phase, and/or after a cooling phase wherein the rate of cooling of the pressure medium in the treatment region exceeded a selected cooling rate threshold value. By such actions, a good mixing of the pressure medium within the treatment region may be achieved, and possibly relatively quickly. Further, the pressure medium supplying rate of the pressure medium supplying device may be controlled so as maintain the temperature in the treatment region within the selected temperature range, e.g., over the period of time. This may further help in achieving a good mixing of the pressure medium within the treatment region.

The pressure medium supplying device may for example comprise a pressure medium guiding passage, or several pressure medium guiding passages, within the pressure vessel. The pressure medium guiding passage(s) may be arranged such that the other region is in fluid communication with the treatment region by means of the pressure medium guiding passage(s). The pressure medium supplying device may be configured to selectively and controllably transport pressure medium from the other region to the treatment region via the pressure medium guiding passage(s) (e.g., via each of the pressure medium guiding passages).

The pressure medium supplying device may comprise pressure medium flow restriction means. The pressure medium flow restriction means may be configured to selectively and controllably impede or obstruct pressure medium flow in the pressure medium guiding passage(s) (e.g., in each or any of the pressure medium guiding passages), whereby pressure medium flow between the other region and the treatment region can be selectively impeded or obstructed or not impeded or obstructed by the pressure medium flow restriction means.

In the context of the present application, by the pressure medium flow restriction means being configured to selectively and controllably impede or obstruct pressure medium flow, it is not necessarily meant that the pressure medium flow restriction means completely impedes or obstructs the pressure medium flow (but the pressure medium flow restriction means may be configured to do so). The pressure medium flow restriction means may be configured to partially impede or obstruct the pressure medium flow, e.g., so as to impede or obstruct the pressure medium flow so as to obtain a pressure medium flow amounting to, e.g., 10%, 50%, or 75% of the pressure medium flow if unimpeded or unobstructed. Such functionality can be provided for example with certain types of valves.

The controlling of the pressure medium supplying rate of the pressure medium supplying device may comprise controlling the pressure medium flow restriction means so that pressure medium flow between the other region and the treatment region is impeded or obstructed or not impeded or obstructed by the pressure medium flow restriction means.

The pressure medium flow restriction means may for example comprise one or more adjustable throttles. The one or more adjustable throttles may for example be arranged in or on the pressure medium guiding passage(s). For example, an adjustable throttle may be arranged in or on each pressure medium guiding passage.

In alternative or in addition, the pressure medium flow restriction means may comprise one or more adjustable valves, such as, for example, one or more solenoid valves. In alternative or in addition another or other types of valves may be used.

The pressure medium flow restriction means may be operated so as impede or obstruct pressure medium flow in the pressure medium guiding passage(s) (which may be referred to as the pressure medium flow restriction means being "closed") and not impede or obstruct pressure medium flow in the pressure medium guiding passage(s) (which may be referred to as the pressure medium flow restriction means being "open"), respectively, alternatingly and consecutively. Thus, the pressure medium flow restriction means may be operated so as to be alternatingly open and closed (or, e.g., partially opened and closed), with the period of time that the pressure medium flow restriction means is open and the period of time that the pressure medium flow restriction means is closed, respectively, being fixed or variable. The inventors have found out that by such pressure medium flow restriction means and operation thereof, it may be further facilitated to control the rate of cooling of the pressure medium in the treatment region to obtain a selected rate of cooling of the pressure medium in the treatment region that is within a relatively large rate range, e.g., over a period of time, and with a relatively high precision.

For example, the controlling of the pressure medium supplying rate of the pressure medium supplying device may comprise controlling the pressure medium flow restriction means so that pressure medium flow between the other region and the treatment region is impeded or obstructed by the pressure medium flow restriction means during at least one first period of time, and so that pressure medium flow between the other region and the treatment region is not impeded or obstructed by the pressure medium flow restriction means during at least one second period of time. The at least one first period of time and the at least one second period of time may be alternating in sequence (or sequentially alternating) and contiguous so as to form a continuous period of time in which the first period(s) of time and the second period(s) of time are alternating.

A length of the first period(s) of time may be different from, or the same (or substantially the same) as, a length of the second period(s) of time.

The pressure medium flow restriction means may for example comprise a plurality of pressure medium flow restriction (sub-)means. The controlling of the pressure medium supplying rate of the pressure medium supplying device may comprise controlling all or a selected subset of the pressure medium flow restriction (sub-)means so that pressure medium flow between the other region and the treatment region is impeded or obstructed by the controlled pressure medium flow restriction (sub-)means during at least one first period of time, and so that pressure medium flow between the other region and the treatment region is not impeded or obstructed by the controlled pressure medium flow restriction (sub-)means during at least one second period of time. The at least one first period of time and the at least one second period of time may be alternating in sequence (or sequentially alternating) and contiguous so as to form a continuous period of time in which the first period(s) of time and the second period(s) of time are alternating.

The sequence of steps of obtaining of values indicative of at least one temperature in the treatment region at a plurality of time instants, the determination of a cooling power for cooling of the pressure medium in the treatment region based on the obtained values, the determination of a difference between the required cooling power required to obtain the selected value for the rate of cooling of the pressure medium in the treatment region and the determined cooling power, and the controlling of the operating rate of the pressure medium circulation flow generator, the controlling of the pressure medium supplying rate of the pressure medium supplying device and/or the heating of the pressure medium in the treatment region using the pressure medium heating device based on the determined difference may possibly be carried out repeatedly. The length of at least one first period of time, the length of at least one second period of time and/or the length of the continuous period of time may vary between different times the sequence of steps are carried out. In alternative, the length of the at least one first period of time, the at least one second period of time and the continuous period of time may possibly be the same each time the sequence of steps is carried out.

The pressure medium flow restriction means may comprise or be constituted by a single device or means (e.g., one adjustable throttle or valve), or may possibly comprise or be constituted by several devices or means (e.g., several adjustable throttles and/or valves).

The pressure medium flow restriction means may for example comprise at least a first pressure medium flow restriction means and a second pressure medium flow restriction means. Each of the first pressure medium flow restriction means and the second pressure medium flow restriction means may be configured to selectively and controllably impede or obstruct pressure medium flow in the at least one pressure medium guiding passage, whereby pressure medium flow between the other region and the treatment region can be selectively impeded or obstructed or not impeded or obstructed by each of the first pressure medium flow restriction means and the second pressure medium flow restriction means.

The controlling of the pressure medium supplying rate of the pressure medium supplying device may comprise controlling the first pressure medium flow restriction means so that pressure medium flow in the at least one pressure medium guiding passage between the other region and the treatment region is impeded or obstructed by the first pressure medium flow restriction means during at least one first period of time and so that pressure medium flow in the at least one pressure medium guiding passage between the other region and the treatment region is not impeded or obstructed by the first pressure medium flow restriction means during at least one second period of time. The at least one first period of time and the at least one second period of time may be alternating in sequence (or sequentially alternating) and contiguous so as to form a continuous period of time in which the first period(s) and the second period(s) are alternating. The second pressure medium flow restriction means may be controlled so that pressure medium flow in the at least one pressure medium guiding passage between the other region and the treatment region is not impeded or obstructed by the second pressure medium flow restriction means at least during the continuous period of time.

The pressure medium supplying device may for example comprise at least a first pressure medium guiding passage and a second pressure medium guiding passage within the pressure vessel. Each of the first pressure medium guiding passage and the second pressure medium guiding passage may be arranged such that the other region is in fluid communication with the treatment region by means of the respective pressure medium guiding passage. The first pressure medium flow restriction means and the second pressure medium flow restriction means are configured to selectively and controllably impede or obstruct pressure medium flow in the first pressure medium guiding passage and the second pressure medium guiding passage, respectively.

The controlling of the pressure medium supplying rate of the pressure medium supplying device may comprise controlling the first pressure medium flow restriction means so that pressure medium flow in the first pressure medium guiding passage between the other region and the treatment region is impeded or obstructed by the first pressure medium flow restriction means during at least one first period of time and so that pressure medium flow in the first pressure medium guiding passage between the other region and the treatment region is not impeded or obstructed by the first pressure medium flow restriction means during at least one second period of time. The at least one first period of time and the at least one second period of time may be alternating in sequence (or sequentially alternating) and contiguous so as to form a continuous period of time in which the first period(s) and the second period(s) are alternating. The second pressure medium flow restriction means may be controlled so that pressure medium flow in the second pressure medium guiding passage between the other region and the treatment region is not impeded or obstructed by the second pressure medium flow restriction means at least during the continuous period of time.

The pressure medium flow restriction means may for example comprise at least a first pressure medium flow restriction means, a second pressure medium flow restriction means and a third pressure medium flow restriction means. Each of the first pressure medium flow restriction means, the second pressure medium flow restriction means and the third pressure medium flow restriction means may be configured to selectively and controllably impede or obstruct pressure medium flow in the at least one pressure medium guiding passage, whereby pressure medium flow between the other region and the treatment region can be selectively impeded or obstructed or not impeded or obstructed by each of the first pressure medium flow restriction means, the second pressure medium flow restriction means and the third pressure medium flow restriction means.

The controlling of the pressure medium supplying rate of the pressure medium supplying device may comprise controlling the first pressure medium flow restriction means so that pressure medium flow in the at least one pressure medium guiding passage between the other region and the treatment region is impeded or obstructed by the first pressure medium flow restriction means during at least one first period of time and so that pressure medium flow in the at least one pressure medium guiding passage between the other region and the treatment region is not impeded or obstructed by the first pressure medium flow restriction means during at least one second period of time. The at least one first period of time and the at least one second period of time may be alternating in sequence (or sequentially alternating) and contiguous so as to form a continuous period of time in which the first period(s) and the second period(s) are alternating. Each of the second pressure medium flow restriction means and the third pressure medium flow restriction means may be controlled so that pressure medium flow in the at least one pressure medium guiding passage between the other region and the treatment region is not impeded or obstructed by the second pressure medium flow restriction means or the third pressure medium flow restriction means at least during the continuous period of time.

The pressure medium supplying device may comprise at least a first pressure medium guiding passage, a second pressure medium guiding passage and a third pressure medium guiding passage within the pressure vessel. Each of the first pressure medium guiding passage, the second pressure medium guiding passage and the third pressure medium guiding passage may be arranged such that the other region is in fluid communication with the treatment region by means of the respective pressure medium guiding passage. The first pressure medium flow restriction means, the second pressure medium flow restriction means and the third pressure medium flow restriction means may be configured to selectively and controllably impede or obstruct pressure medium flow in the first pressure medium guiding passage, the second pressure medium guiding passage and the third pressure medium guiding passage, respectively. The controlling of the pressure medium supplying rate of the pressure medium supplying device may comprise controlling the first pressure medium flow restriction means so that pressure medium flow in the first pressure medium guiding passage between the other region and the treatment region is impeded or obstructed by the first pressure medium flow restriction means during at least one first period of time and so that pressure medium flow in the first pressure medium guiding passage between the other region and the treatment region is not impeded or obstructed by the first pressure medium flow restriction means during at least one second period of time. The at least one first period of time and the at least one second period of time may be alternating in sequence (or sequentially alternating) and contiguous so as to form a continuous period of time in which the first period(s) and the second period(s) are alternating. The second pressure medium flow restriction means and the third pressure medium flow restriction means may be controlled so that pressure medium flow in the second pressure medium guiding passage and the third pressure medium guiding passage, respectively, between the other region and the treatment region is not impeded or obstructed by the second pressure medium flow restriction means and the third pressure medium flow restriction means, respectively, at least during the continuous period of time.

It is to be understood that the pressure medium flow restriction means may in principle comprise any number of pressure medium flow restriction means, such as, for example, one, two, or three, as described in the foregoing, or more, such as four, five, six, ten, twelve, fifteen or twenty, for example. It is to be understood that the pressure medium supplying device may in principle comprise any number of pressure medium guiding passages, such as, for example, one, two, or three, as described in the foregoing, or more, such as four, five, six, or ten, for example.

The treatment region may be defined by a load compartment within the furnace chamber. The furnace chamber may be at least partly enclosed by a heat insulated casing and arranged so that pressure medium can enter and exit the furnace chamber. The furnace chamber may comprise at least one pressure medium guiding passage, which may be at least in part formed between the heat insulated casing and the load compartment and which may be in fluid communication with the load compartment so as to form an inner convection loop, wherein pressure medium in the inner convection loop is guided through the load compartment and through the at least one pressure medium guiding passage of the furnace chamber and back to the load compartment, or vice versa.

The pressure medium circulation flow generator may be configured to selectively control the flow rate of pressure medium in the inner convection loop.

The heating of the pressure medium in the treatment region based on the determined difference may for example comprise controlling the flow rate of pressure medium in the inner convection loop based on the determined difference using the pressure medium circulation flow generator.

As described in the foregoing, the pressure medium heating device may for example comprise or be constituted by a furnace, which may be comprised in the furnace chamber or be a part or portion of the furnace chamber. The furnace may be configured such that by controlling the electrical power input into the furnace, the pressure medium within the furnace chamber can be controllably heated by the furnace. By operating the furnace so as to introduce thermal energy or heating power in the treatment region or furnace chamber and controlling the flow rate of pressure medium in the inner convection loop, a controlled heating of the pressure medium in the treatment region may be facilitated.

For example, as mentioned in the foregoing, the pressure medium circulation flow generator may comprise a pressure medium flow generator constituted by or including at least one fan, wherein the at least one fan may have a controllable number of revolutions per minute (rpm), and the flow rate of pressure medium in the inner convection loop may be controlled by means of controlling the rpm of the at least one fan.

The pressure medium circulation flow generator may for example be arranged at or in an opening in the load compartment, e.g., at or in an opening in a bottom, or lower part or portion of the load compartment.

The controlling of the operating rate of the pressure medium circulation flow generator, the controlling of the pressure medium supplying rate of the pressure medium supplying device and/or the heating of the pressure medium in the treatment region using the pressure medium heating device based on the determined difference may for example be carried out using a proportional-integral (PI) controller.

Employing a controller such as a PI controller for carrying out the above-mentioned controlling and/or heating may facilitate achieving a selected rate of cooling of the pressure medium in the treatment region over time, wherein the temperature of the pressure medium in the treatment region versus time may conform to, or substantially conform to, a selected relationship, such as, for example, a linear one. The PI controller may have a gain parameter and an integration time parameter. The values of the gain parameter and the integration time parameter to be used may be determined by tuning of the PI controller in a manner as such known in the art.

Another or other types of controllers than PI controllers may be used. For example, instead of or in addition to using a PI controller, a proportional-integral-derivative (PID) controller may be employed for carrying out the above-mentioned controlling and/or heating.

It is to be understood that the use of a controller such as a PI controller or a PID controller is not required, and that the use thereof is optional. For example, the carrying out the above-mentioned controlling and/or heating may be carried out using another or other types of controllers for example such as known in the art.

At least one value indicative of at least one temperature in the pressure vessel may be obtained. (The at least one value indicative of at least one temperature in the pressure vessel may or may not be the same as one or more of the above-mentioned values indicative of at least one temperature in the treatment region.) Based on the at least one value indicative of at least one temperature in the pressure vessel, a value of a predefined temperature-related parameter of the pressure vessel may be determined. The predefined temperature-related parameter of the pressure vessel may be a function of the at least one value indicative of at least one temperature in the pressure vessel. A difference between a selected value of the predefined temperature-related parameter of the pressure vessel and the determined value of the predefined temperature-related parameter of the pressure vessel may be determined. The controlling of the operating rate of the pressure medium circulation flow generator, the controlling of the pressure medium supplying rate of the pressure medium supplying device and/or the heating of the pressure medium in the treatment region using the pressure medium heating device based on the determined difference may be (further) made based on the difference between the selected value of the predefined temperature-related parameter of the pressure vessel and the determined value of the predefined temperature-related parameter of the pressure vessel.

The determination of a predefined temperature-related parameter of the pressure vessel based on the at least one value indicative of at least one temperature in the pressure vessel, the determination of a difference between a selected value of the predefined temperature-related parameter of the pressure vessel and the determined value of the predefined temperature-related parameter of the pressure vessel, and the controlling of the operating rate of the pressure medium circulation flow generator, the controlling of the pressure medium supplying rate of the pressure medium supplying device and/or the heating of the pressure medium in the treatment region based on the determined difference using the pressure medium heating device based on the difference between the selected value of the predefined temperature-related parameter of the pressure vessel and the determined value of the predefined temperature-related parameter of the pressure vessel may be carried out repeatedly, for example such that the value of the predefined temperature-related parameter of the pressure vessel does not exceed the selected value thereof, e.g., over a period of time. Accordingly, the method may comprise or constitute a control loop mechanism for facilitating or ensuring that the predefined temperature-related parameter of the pressure vessel does not exceed the selected value thereof, e.g., over a period of time.

The predefined temperature-related parameter of the pressure vessel may for example comprise a temperature in the above-mentioned other region in the pressing arrangement, such as, for example, in the herein-mentioned outer cooling loop. For example, predefined temperature-related parameter of the pressure vessel may comprise a temperature in or at a pressure medium guiding passage arranged to guide the pressure medium having exited the furnace chamber in proximity to an inner surface of walls of the pressure vessel, and possibly a temperature of an inner surface of walls of the pressure vessel, such as a temperature of an inner surface of a pressure cylinder and/or an end closure of the pressure vessel (e.g., a top end closure, or a bottom end closure). The selected value of the predefined temperature-related parameter could in that case for example be a maximum allowed temperature of an inner surface of walls of the pressure vessel. Thus, the controlling of the operating rate of the pressure medium circulation flow generator, the controlling of the pressure medium supplying rate of the pressure medium supplying device and/or the heating of the pressure medium in the treatment region based on the determined difference using the pressure medium heating device may be carried out, e.g., continuously or continually, for example such that the maximum allowed temperature of an inner surface of walls of the pressure vessel is not exceeded. For example, in case a maximum allowed temperature of an inner surface of walls of the pressure vessel would be exceeded (e.g., a temperature of an inner surface of an end closure of the pressure vessel (e.g., a top end closure, or a bottom end closure)), the pressure medium supplying device may be controlled so as to impede or obstruct pressure medium flow in some or any pressure medium guiding passage(s) of the controllable pressure medium supplying device. For example, in case a rate of cooling in the pressure vessel would be very high, e.g., at the beginning of a cooling phase, it could happen that a maximum allowed temperature of an inner surface of an end closure of the pressure vessel would be exceeded. The pressure medium supplying device may be controlled so as to decrease the pressure medium supplying rate of the pressure medium supplying device so that the rate of cooling, e.g., of the pressure medium in the treatment region, decreases, such that the maximum allowed temperature of an inner surface of an end closure of the pressure vessel is not exceeded. Possibly, in case a maximum allowed temperature of an inner surface of walls of the pressure vessel would be exceeded (e.g., a temperature of an inner surface of an end closure of the pressure vessel (e.g., a top end closure, or a bottom end closure)), the pressure medium supplying device may be deactivated (i.e. not operated) in response thereto, e.g., during some period of time.

In alternative or in addition, predefined temperature-related parameter of the pressure vessel may for example comprise a temperature of a motor for driving any pressure medium flow generator of the pressing arrangement, such as the above-mentioned pressure medium circulation flow generator and/or any pressure medium flow generator of the above-mentioned pressure medium supplying device. The selected value of the predefined temperature-related parameter could in that case comprise a maximum allowed operating temperature of the motor.

In alternative or in addition, predefined temperature-related parameter of the pressure vessel may for example comprise a temperature of coolant of any cooling circuit arranged around the outside surface of the outer walls of the pressure cylinder or pressure vessel for cooling walls of the pressure vessel. The selected value of the predefined temperature-related parameter could in that case comprise a maximum allowed temperature of the coolant.

According to a second aspect, there is provided a pressing arrangement.

The pressing arrangement according to the second aspect comprises a pressure vessel, which is arranged to hold pressure medium therein during use of the pressing arrangement. The pressing arrangement comprises a furnace chamber, which is arranged within the pressure vessel, and which is arranged so that pressure medium can enter and exit the furnace chamber. A treatment region is at least in part defined by the furnace chamber, wherein the treatment region is arranged to accommodate an article. The pressing arrangement is configured to subject the article to a treatment cycle including a cooling phase. The pressing arrangement comprises a pressure medium circulation flow generator. The pressure medium circulation flow generator is configured to provide a circulation of pressure medium within the pressure vessel, wherein during the circulation of the pressure medium the pressure medium passes through the furnace chamber, wherein the pressure medium circulation flow generator is controllable at least with respect to operating rate thereof. The pressing arrangement comprises a pressure medium heating device configured to selectively and controllably heat the pressure medium within the pressure vessel for increasing the temperature of the pressure medium in the treatment region.

The pressing arrangement according to the second aspect comprises at least one sensor configured to sense of at least one temperature in the pressure vessel.

The pressing arrangement according to the second aspect comprises at least one control and processing module. The at least one control and processing module is communicatively coupled with the at least sensor and communicatively coupled with the pressure medium circulation flow generator and the pressure medium heating device for controlling operation of the pressure medium circulation flow generator and the pressure medium heating device, respectively, for controlling the rate of cooling of the pressure medium in the treatment region. The at least one control and processing module is configured to, during the cooling phase:
  obtain values indicative of at least one temperature in the treatment region at a plurality of time instants;
  based on the obtained values, determine a cooling power for cooling of the pressure medium in the treatment region;
  determine a difference between a required cooling power required to obtain a selected value for the rate of cooling of the pressure medium in the treatment region and the determined cooling power; and
  based on the determined difference, control the operating rate of the pressure medium circulation flow generator so that a difference between the cooling power for cooling of the pressure medium in the treatment region and the required cooling power decreases;
  if the cooling power for cooling of the pressure medium in the treatment region provided by the operation of the pressure medium circulation flow generator exceeds a cooling power corresponding to the selected value for the rate of cooling of the pressure medium in the treatment region: based on the determined difference heat the pressure medium in the treatment region based on the determined difference using the pressure medium heating device so that a difference between the cooling power for cooling of the pressure medium in the treatment region and the required cooling power decreases.

The pressing arrangement may comprise a pressure medium supplying device. The pressure medium supplying device may be configured to selectively and controllably transport pressure medium during the cooling phase from another region in the pressing arrangement to the treatment region, wherein the temperature of the pressure medium in the other region is lower than the temperature of the pressure medium in the treatment region during at least part of the cooling phase for decreasing the temperature of the pressure medium in the treatment region by transport of pressure medium during the cooling phase from the other region to the treatment region. The pressure medium supplying device may be controllable at least with respect to pressure medium supplying rate. The at least one control and processing module may be communicatively coupled with the pressure medium supplying device for controlling operation thereof, for controlling the rate of cooling of the pressure medium in the treatment region. The at least one control and processing module may be configured to, during the cooling phase:

if the maximally possible cooling power for cooling of the pressure medium in the treatment region provided by the operation of the pressure medium circulation flow generator is below a cooling power corresponding to the selected value for the rate of cooling of the pressure medium in the treatment region: based on the determined difference, control the pressure medium supplying rate of the pressure medium supplying device so that a difference between the cooling power for cooling of the pressure medium in the treatment region and the required cooling power decreases.

The communicative coupling between the at least one control and processing module and the at least sensor, the pressure medium circulation flow generator, the pressure medium heating device, and possibly the pressure medium supplying device, respectively, may be realized or implemented for example by means of any appropriate wired and/or wireless communication means or techniques as known in the art.

The furnace chamber may be at least partly enclosed by a heat insulated casing arranged so that pressure medium can enter and exit the furnace chamber. The treatment region may be comprised or constituted by an interior of the furnace chamber.

The pressing arrangement may comprise a plurality of pressure medium guiding passages in fluid communication with the furnace chamber and arranged to form an outer cooling loop within the pressure vessel. The pressure medium supplying device may be configured to transport pressure medium during the cooling phase from the outer cooling loop to the furnace chamber (or to the treatment region therein). The above-mentioned other region in the pressing arrangement may comprise at least a part of the outer cooling loop.

During passage of pressure medium in the outer cooling loop, transfer of heat from the pressure medium may take place to other parts or portions of the pressure vessel which for example may be located in proximity to walls of the pressure vessel or an end closure of the pressure vessel, via which transfer of heat from the pressure medium to the outside of the pressure vessel may take place. Thus, the temperature of the pressure medium in the outer cooling loop may be lower than the temperature of the pressure medium in the treatment region.

The pressure vessel may comprise a pressure cylinder and an end closure. The heat insulated casing may comprise a heat insulating portion and a housing at least partly enclosing the heat insulating portion. A part of the outer cooling loop may comprise at least one first pressure medium guiding passage, which may be formed between at least portions of the housing and the heat insulating portion, respectively, and which may be arranged to guide the pressure medium after having exited the furnace chamber towards the end closure. Another part of the outer cooling loop may comprise at least one second pressure medium guiding passage arranged to guide the pressure medium having exited the furnace chamber in proximity to an inner surface of walls of the pressure cylinder. The pressure medium supplying device may be configured to transport pressure medium during the cooling phase from the other part of the outer cooling loop to the furnace chamber (or to the treatment region therein). The above-mentioned other region in the pressing arrangement may comprise at least a part of the other part of the outer cooling loop.

By guiding pressure medium in proximity to an inner surface of walls of the pressure cylinder, transfer of heat from the pressure medium to the outside of the pressure vessel (or pressure cylinder) may take place via the walls of the pressure cylinder. Thereby, the temperature of the pressure medium in the outer cooling loop, such as in the other part of the outer cooling loop, may be lower than the temperature of the pressure medium in the treatment region.

To increase the transfer of heat from the pressure medium guided in proximity to an inner surface of walls of the pressure cylinder to the outside of the pressure cylinder, the outer surface of the outer walls of the pressure vessel (or pressure cylinder) may be provided with channels, conduits or tubes, etc., which channels, conduits or tubes for example may be arranged so as to be in connection with the outer surface of the outer wall of the pressure vessel and may be arranged to run parallel to an axial direction of the pressure vessel or helically or spirally around the outer surface of the outer wall of the pressure vessel. A coolant for cooling of the walls of the pressure vessel may be provided in the channels, conduits or tubes, whereby the walls of the pressure vessel may be cooled in order to protect the walls from detrimental heat building up during operation of the pressure vessel. The coolant in the channels, conduits or tubes may for example comprise water, but another or other types of coolants are possible.

On the outside surface of the outer walls of the pressure cylinder, and possibly on any channels, conduits and/or tubes, etc. for coolant as described in the foregoing, pre-stressing means may be provided. The pre-stressing means may for example be provided in the form of wires (e.g., made of steel) wound in a plurality of turns so as to form one or more bands, and preferably in several layers, around the outside surface of the outer walls of the pressure cylinder and possibly also any channels, conduits and/or tubes, etc. for coolant that may be provided thereon. The pre-stressing means may be arranged for exerting radial compressive forces on the pressure cylinder.

The pressure medium supplying device may for example comprise at least one pressure medium guiding passage within the pressure vessel. The at least one pressure medium guiding passage may be arranged such that the other region is in fluid communication with the treatment region by means of the at least one pressure medium guiding passage. The pressure medium supplying device may be configured to selectively and controllably transport pressure medium from the other region to the treatment region via the at least one pressure medium guiding passage. The controllable pressure medium supplying device may comprise pressure medium flow restriction means, which may be configured to selectively and controllably impede or obstruct pressure medium flow in the at least one pressure medium guiding passage, whereby pressure medium flow between the other region and the treatment region can be selectively impeded or obstructed or not impeded or obstructed by the pressure medium flow restriction means.

The at least one pressure medium guiding passage may for example comprise at least one conduit, which may extend from the other region to or towards the treatment region, and possibly one or more openings comprised in the at least one conduit. The one or more openings may provide fluid communication between the other region and an interior of the at least one conduit, wherein pressure medium from the other region entering the interior of the at least one conduit can be transported to the treatment region via the at least one conduit. The pressure medium flow restriction means may be arranged at least in part in the one or more openings and are configured to selectively and controllably impede or obstruct pressure medium flow between the other region and the interior of the at least one conduit via the one or more openings.

The pressing arrangement may comprise a plurality of guiding passages for pressure medium. The plurality of guiding passages may be in fluid communication with the furnace chamber and arranged within the pressure vessel to form a loop within the pressure vessel. The pressing arrangement may comprise at least one pressure medium flow generator (e.g., comprising one or more fans, ejectors, circulation means, or the like) for circulating pressure medium within the pressure vessel via at least one of the plurality of guiding passages, whereby pressure medium is arranged to pass through the furnace chamber or treatment region (or the load compartment). The pressing arrangement may comprise a heat exchanging element arranged in a top end closure or in a bottom end closure of the pressure vessel. The heat exchanging element may comprise at least one passage comprising an inlet from at least one of the plurality of guiding passages and an outlet into at least one of the plurality of guiding passages for allowing a flow of pressure medium through the heat exchanging element and within the pressure vessel. The heat exchanging element may comprise at least one circuit (e.g. comprising one or more tubes, ducts, pipes, etc.) for allowing a circulation of cooling medium within the at least one circuit of the heat exchanging element for a cooling of pressure medium arranged to flow through the heat exchanging element. By the active cooling achieved by the circulation of cooling medium (e.g. comprising water and/or organic chemical(s)) within the heat exchanging element, a highly efficient cooling of the pressure medium may be achieved. The above-mentioned other region in the pressing arrangement may comprise at least a part of the above-mentioned loop within the pressure vessel. The above-mentioned loop within the pressure vessel may at least in part constitute the above-mentioned outer cooling loop.

According to a third aspect, there is provided a control and processing module for use in conjunction with a pressing arrangement according to the second aspect. The control and processing module is communicatively coupled with the at least sensor of the pressing arrangement and communicatively coupled with the pressure medium circulation flow generator and the pressure medium heating device for controlling operation of the pressure medium circulation flow generator and the pressure medium heating device, respectively, for controlling the rate of cooling of the pressure medium in the treatment region. The control and processing module is configured to:

obtain values indicative of at least one temperature in the treatment region at a plurality of time instants;
    based on the obtained values, determine a cooling power for cooling of the pressure medium in the treatment region;
    determine a difference between a required cooling power required to obtain a selected value for the rate of cooling of the pressure medium in the treatment region and the determined cooling power; and
    based on the determined difference, control the operating rate of the pressure medium circulation flow generator so that a difference between the cooling power for cooling of the pressure medium in the treatment region and the required cooling power decreases;
    if the cooling power for cooling of the pressure medium in the treatment region provided by the operation of the pressure medium circulation flow generator exceeds a cooling power corresponding to the selected value for the rate of cooling of the pressure medium in the treatment region: based on the determined difference, heat the pressure medium in the treatment region using the pressure medium heating device so that a difference between the cooling power of cooling of the pressure medium in the treatment region and the required cooling power decreases.

The control and processing module may alternatively be referred to as a control and/or processing module, or control and processing circuitry, or control and/or processing circuitry. The control and processing module may for example include or be constituted by any suitable central processing unit (CPU), microcontroller, digital signal processor (DSP), Application Specific Integrated Circuit (ASIC), Field Programmable Gate Array (FPGA), etc., or any combination thereof. The control and processing module may optionally be capable of executing software instructions stored in a computer program product e.g. in the form of a memory. The memory may for example be any combination of read and write memory (RAM) and read only memory (ROM). The memory may comprise persistent storage, which for example can be a magnetic memory, an optical memory, a solid state memory or a remotely mounted memory, or any combination thereof.

According to a fourth aspect there is provided a computer program product. The computer program product is configured to, when executed in a control and processing module according to the third aspect, perform a method according to the first aspect.

According to a fifth aspect there is provided a computer-readable storage medium on which there is stored a computer program product. The computer program product is configured to, when executed in a control and processing module according to the third aspect, perform a method according to the first aspect.

The computer-readable storage medium may for example include a Digital Versatile Disc (DVD) or a floppy disk or any other suitable type of computer-readable means or computer-readable (digital) storage medium, such as, but not limited to, a memory such as, for example, nonvolatile memory, a hard disk drive, a Compact Disc (CD), a Flash memory, magnetic tape, a Universal Serial Bus (USB) memory device, a Zip drive, etc.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

Figure 3:
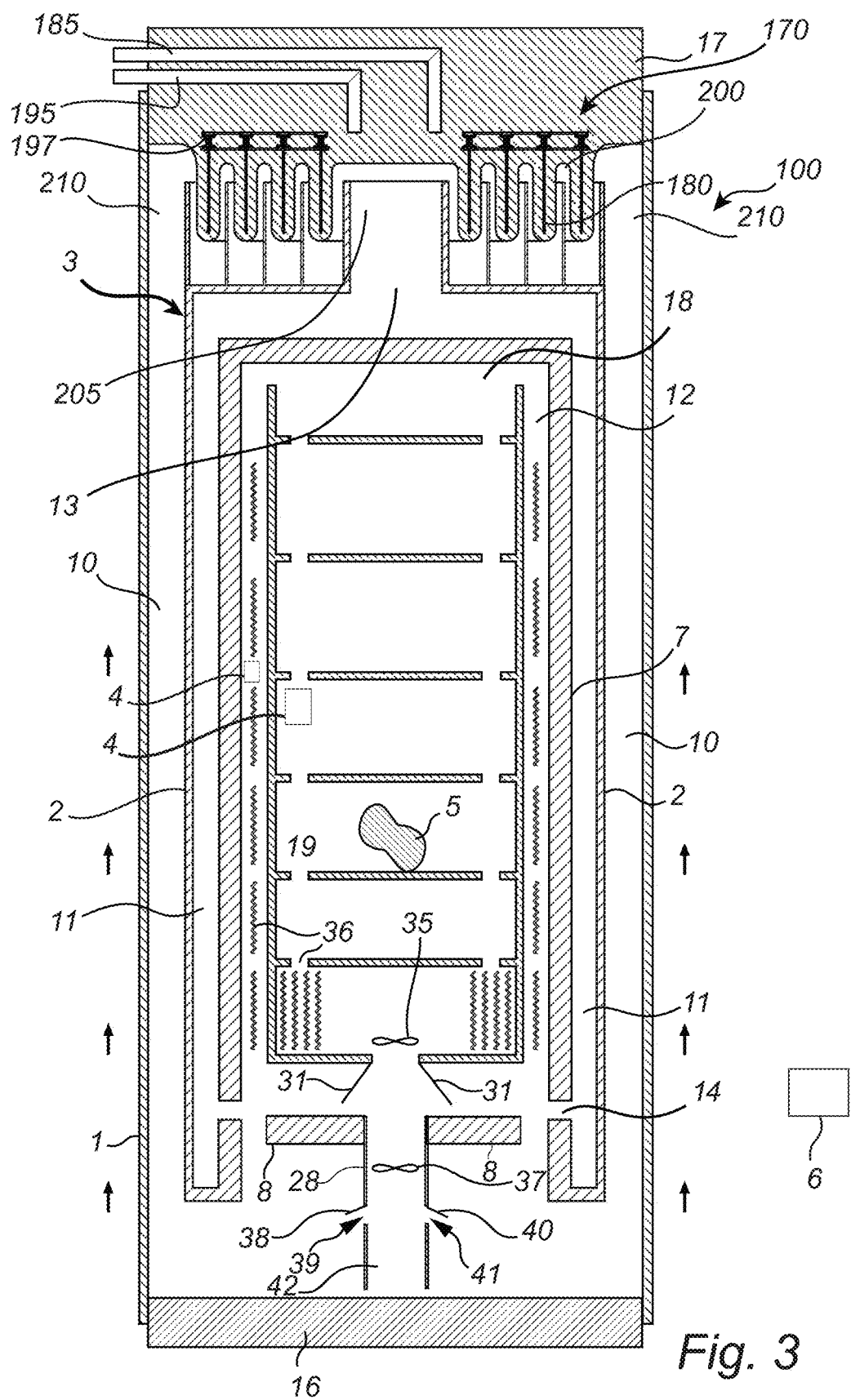
Figure 4:
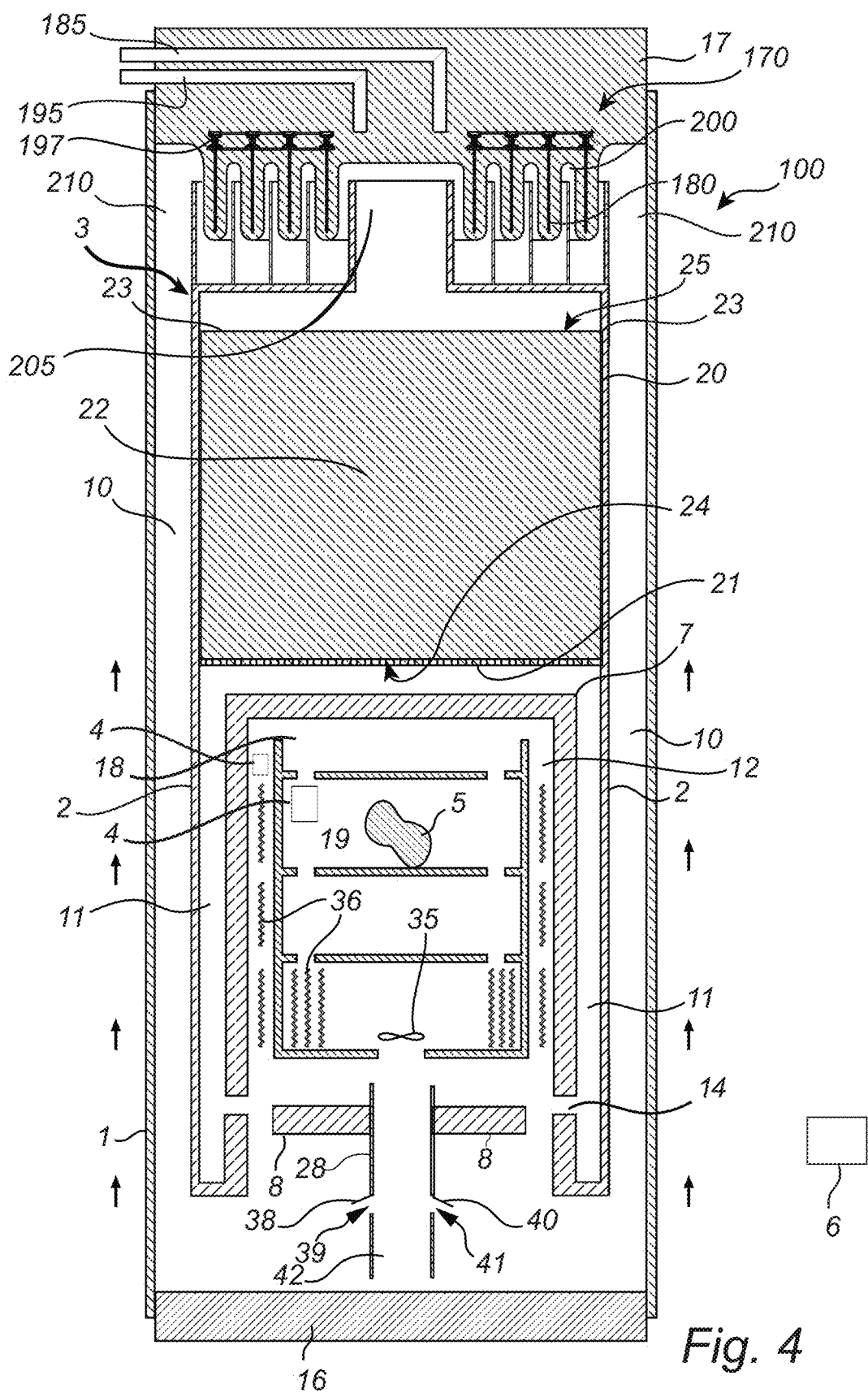

Each of FIGS. 3 and 4 is a schematic, in part sectional, side view of a pressing arrangement according to an embodiment of the present invention.

The figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are illustrated. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
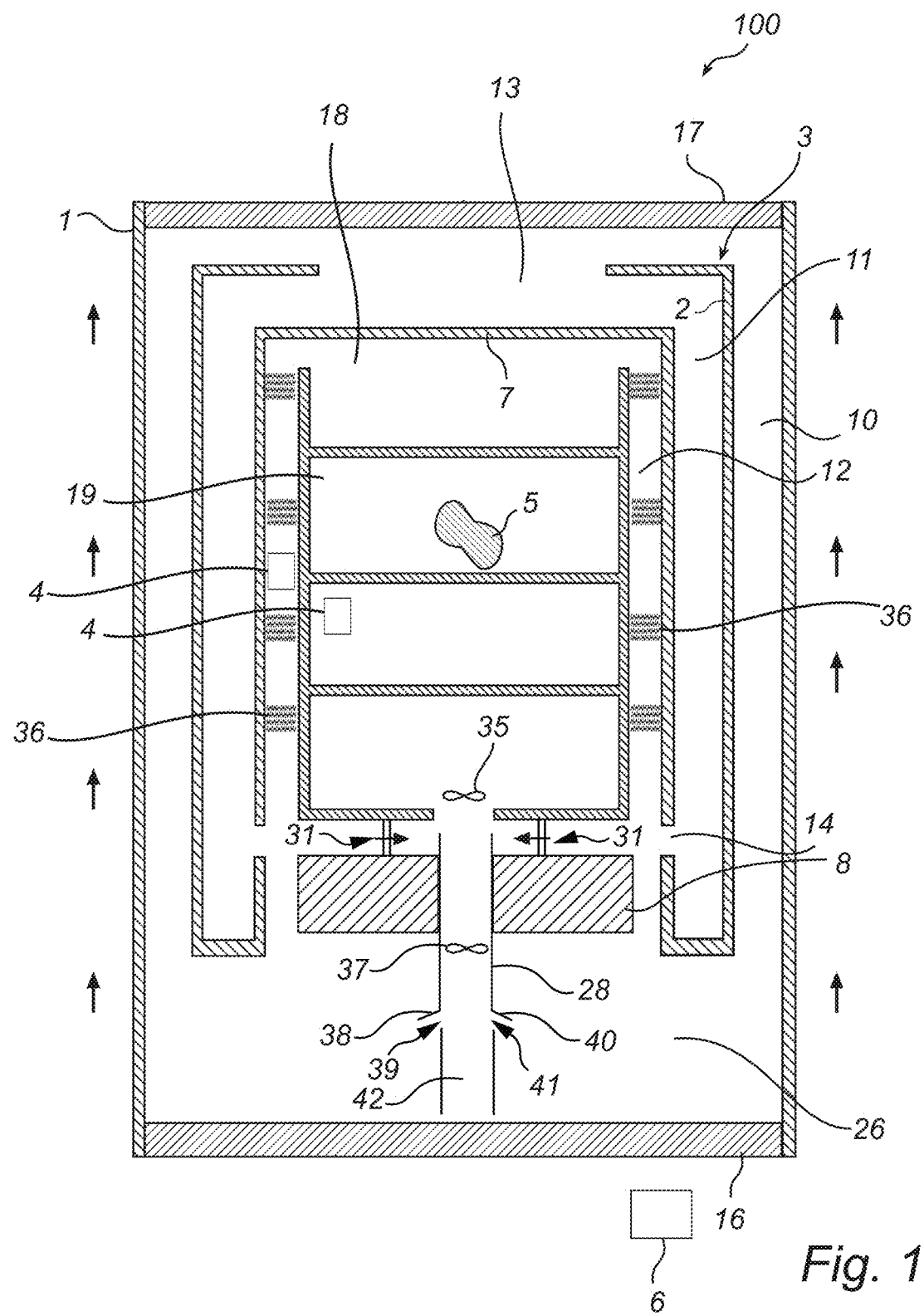
FIG. 1 is a schematic, in part sectional, side view of a pressing arrangement according to an embodiment of the present invention.

FIG. 1 is a schematic, in part sectional, side view of a pressing arrangement 100 according to an embodiment of the present invention. The pressing arrangement 100 is arranged for treatment of at least one article by means of pressing, for example by means of hot pressing such as hot isostatic pressing (HIP).

The pressing arrangement 100 comprises a pressure vessel, which comprises a pressure cylinder 1 and a top end closure 17 and a bottom end closure 16, or more generally a first end closure and a second end closure, respectively. It is to be understood that the pressure vessel—which will be collectively referred to in the following by way of the reference numerals 1, 16 and 17—may comprise additional parts, components or elements not illustrated in FIG. 1. The pressure vessel 1, 16, 17 is arranged to hold pressure medium therein during use of the pressing arrangement 100.

As per the embodiment of the present invention illustrated in FIG. 1, the pressure vessel 1, 16, 17 comprises a furnace chamber 18. The furnace chamber 18 may comprise a furnace, or heater or heating elements, for heating of the pressure medium in the pressure vessel for example during a pressing phase of a treatment cycle. The furnace is schematically indicated in FIG. 1 by the reference numerals 36. It is to be noted that only some parts of the furnace 36 are indicated by reference numerals 36 in FIG. 1. The parts of the furnace 36 are illustrated in FIG. 1 as eight identical elements. It is however to be understood that the furnace 36 could be provided in in principle any number of parts, and not only eight parts as illustrated in FIG. 1, but fewer or less than eight parts. In accordance with the embodiment of the present invention illustrated in FIG. 1, the furnace 36 is arranged in proximity to the inner side, or lateral, surfaces of the furnace chamber 18. As illustrated in FIG. 1, the furnace 36 may be arranged in a pressure medium guiding passage 12 within the furnace chamber 18, which pressure medium guiding passage 12 is on the outside of a load compartment 19 that is included in the furnace chamber 18. The furnace chamber 18, the pressure medium guiding passage 12 and the load compartment 19 will be described further in the following. It is to be understood that different configurations and arrangements of the furnace 36 in relation to, e.g., within, the furnace chamber 18 are possible. For example, in alternative or in addition to the arrangement of the furnace 36 illustrated in FIG. 1, the furnace 36 could be arranged at a lower portion of the furnace chamber 18. Any implementation of the furnace 36 with regard to arrangement thereof in relation to, e.g., within, the furnace chamber 18 may be used in any one of the embodiments of the present invention described herein. In the context of the present application, the term "furnace" refers to the elements or means for providing heating, while the term "furnace chamber" refers to the area or region in which the furnace and possibly a load compartment and any article are located. As illustrated in FIG. 1, the furnace chamber 18 may not occupy the whole inner space of the pressure vessel 1, 16, 17, but may leave an intermediate space 10 of the interior of the pressure vessel 1, 16, 17 around the furnace chamber 18. The intermediate space 10 forms a pressure medium guiding passage 10. During operation of the pressing arrangement 100, the temperature in the intermediate space 10 may be lower than the temperature in the furnace chamber 18, but the intermediate space 10 and the furnace chamber 18 may be at equal, or substantially equal, pressure.

The pressure vessel 1, 16, 17 includes a treatment region therein. The treatment region may for example be at least in part defined by the furnace chamber 18. For example, the treatment region may be comprised or constituted by an interior of the furnace chamber 18. In the following, the treatment region may be referred to by the reference numeral 18, in accordance with the embodiment of the present invention illustrated in FIG. 1, but it is to be understood that in alternative or in addition another treatment region may be employed.

The treatment region 18 is arranged to accommodate an article 5 (or several articles). In accordance with the embodiment of the present invention illustrated in FIG. 1, the load compartment 19 included in the furnace chamber 18 is arranged to accommodate the article 5.

The outer surface of the outer walls of the pressure vessel 1, 16, 17 may be provided with channels, conduits or tubes, etc. (not shown in FIG. 1), which channels, conduits or tubes for example may be arranged so as to be in connection with the outer surface of the outer wall of the pressure vessel 1, 16, 17 and may be arranged to run parallel to an axial direction of the pressure vessel 1, 16, 17 or helically or spirally around the outer surface of the outer wall of the pressure vessel 1, 16, 17. A coolant for cooling of the walls of the pressure vessel 1, 16, 17 may be provided in the channels, conduits or tubes, whereby the walls of the pressure vessel 1, 16, 17 may be cooled in order to protect the walls from detrimental heat building up during operation of the pressure vessel 1, 16, 17. The coolant in the channels, conduits or tubes may for example comprise water, but another or other types of coolants are possible. An exemplifying flow of coolant in channels, conduits or tubes provided on the outer surface of the outer walls of the pressure vessel 1, 16, 17 is indicated in FIG. 1 by the arrows on the outside of the pressure vessel 1, 16, 17.

On the outside surface of the outer walls of the pressure cylinder 1, and possibly on any channels, conduits and/or tubes, etc. for coolant as described it the foregoing, pre-stressing means may be provided. The pre-stressing means (not shown in FIG. 1) may for example be provided in the form of wires (e.g., made of steel) wound in a plurality of turns so as to form one or more bands, and preferably in several layers, around the outside surface of the outer walls of the pressure cylinder 1 and possibly also any channels, conduits and/or tubes, etc. for coolant that may be provided thereon. The pre-stressing means may be arranged for exerting radial compressive forces on the pressure cylinder 1.

Even though it is not explicitly indicated in FIG. 1, the pressure vessel 1, 16, 17 may be arranged such that it can be opened and closed, such that any article within the pressure vessel 1, 16, 17 may be inserted or removed. An arrangement of the pressure vessel 1, 16, 17 such that it can be opened and closed may be realized in a number of different manners, as known in the art. Although not explicitly indicated in FIG. 1, one or both of the top end closure 17 and the bottom end closure 16 may be arranged so that it or they can be opened and closed.

The pressing arrangement 100 is configured to subject the article 5 to a treatment cycle, which treatment cycle includes a cooling phase, and is arranged so that pressure medium can enter and exit the treatment region. In accordance with the embodiment of the present invention illustrated in FIG. 1, the furnace chamber 18 is enclosed by a heat insulated casing 3 and is arranged so that pressure medium can enter and exit the furnace chamber 18.

Further in accordance with the embodiment of the present invention illustrated in FIG. 1, the heat insulated casing 3 comprises a heat insulating portion 7, a housing 2 which is partly enclosing the heat insulating portion 7, and a bottom insulating portion 8. Not all of the elements of the heat insulated casing 3 may be arranged so as to be heat insulated or heat insulating. For example, the housing 2 may not necessarily be arranged so as to be heat insulated or heat insulating. The heat insulated casing 3 surrounding the furnace chamber 18 is likely to save energy during a heating phase of the treatment cycle to which the pressing arrangement 100 may be configured to subject the article 5 to. The heat insulated casing 3 may also facilitate or ensure that convection takes place in a more ordered manner. Because of the vertically elongated shape of the furnace chamber 18 in the illustrated embodiment of the present invention, the heat insulated casing 3 may prevent forming of horizontal temperature gradients, which may be difficult to monitor and control.

The pressure medium used in the pressure vessel 1, 16, 17 or pressing arrangement 100 may for example comprise or be constituted by a liquid or gaseous medium which may have a relatively low chemical affinity in relation to the article(s) to be treated in the pressure vessel 1, 16, 17. The pressure medium may for example comprise a gas, for example an inert gas such as Argon gas.

As indicated in FIG. 1, the pressure medium may exit the load compartment 19 at a top portion thereof and subsequently be guided in a pressure medium guiding passage 12 between the walls of the load compartment 19 and the heat insulating portion 7, after which the pressure medium may enter into a pressure medium guiding passage 11 by way of openings 14 between the heat insulating portion 7 and the housing 2. The openings 14 between the heat insulating portion 7 and the housing 2 may possibly be provided with valves or any other type of adjustable throttle or pressure medium flow restriction means.

The pressure medium that enters into the pressure medium guiding passage 11 by way of the openings 14 between the heat insulating portion 7 and the housing 2 is guided in the pressure medium guiding passage 11 towards the top end closure 17 where it may exit the pressure medium guiding passage 11 and the heat insulated casing 3 by way of an opening 13 in the housing 2, e.g., a central opening 13 in the housing 2, as illustrated in FIG. 1.

A pressure medium guiding passage defined by the space in part defined by the inner surface of the top end closure 17 and the pressure medium guiding passage 10 is arranged to guide the pressure medium having exited the opening 13 in the housing 2 in proximity to the top end closure 17 and in proximity to an inner surface of walls of the pressure vessel 1, 16, 17 (e.g., the walls of the pressure cylinder 1, respectively, as illustrated in FIG. 1) before the pressure medium re-enters into the furnace chamber 18. Thereby, an outer cooling loop may be formed by at least the pressure medium guiding passage 10 and the pressure medium guiding passage 11. In a part of the outer cooling loop, the pressure medium is guided in proximity to the inner surface of the top end closure 17 and the inner surface of walls of the pressure cylinder 1. The amount of thermal energy which may be transferred from the pressure medium during its passage in proximity to inner surfaces of the top end closure 17 and the inner surface of walls of the pressure cylinder 1 may depend on at least one of the following: the speed of the pressure medium, the amount of pressure medium having (direct) contact with the inner surface of the top end closure 17 and the inner surface of walls of the pressure cylinder 1, the relative temperature difference between the pressure medium and the inner surface of the top end closure 17 and the inner surface of walls of the pressure cylinder 1, the thickness of the top end closure 17 and the thickness of the pressure cylinder 1, and the temperature of any flow of coolant in channels, conduits or tubes provided on the outer surface of walls of the pressure cylinder 1 (indicated in FIG. 1 by the arrows on the outside of the pressure cylinder 1).

The pressure medium that is guided in the pressure medium guiding passage 10 back towards the furnace chamber 18 enters a space 26 between the furnace chamber 18—or the bottom insulating portion 8—and the bottom end closure 16. The furnace chamber 18 may be arranged so that pressure medium can enter the furnace chamber 18 from, and exit the furnace chamber 18 into, the space 26. For example, and in accordance with the embodiment of the present invention illustrated in FIG. 1, the furnace chamber 18 may be provided with an opening in the bottom insulating portion 8 permitting pressure medium flow into or out of the furnace chamber 18. Further in accordance with the embodiment of the present invention illustrated in FIG. 1, there is a pressure medium guiding passage 28, e.g., comprising a conduit 28, arranged so as to extend through the bottom insulating portion 8, with a lower (or first) opening of the pressure medium guiding passage or conduit 28 below the bottom insulating portion 8 (and possibly within the space 26, as per the illustrated embodiment) and an upper (or second) opening of the pressure medium guiding passage or conduit 28 above the bottom insulating portion 8 (and possibly aligned with an opening in the load compartment 19, as per the illustrated embodiment). The lower (or first)

opening of the pressure medium guiding passage or conduit 28 may for example be provided with adjustable flow restriction means such as one or more adjustable throttles or valves.

The pressure medium guiding passage 12 of the furnace chamber 18 and the pressure medium guiding passage formed between the load compartment 19 and the bottom insulating portion 8 are in fluid communication with the load compartment 19 so as to in part form an inner convection loop, wherein pressure medium in the inner convection loop is guided through the load compartment 19 and through the pressure medium guiding passage 12 of the furnace chamber 18 and the pressure medium guiding passage formed between the load compartment 19 and the bottom insulating portion 8 and back to the load compartment 19, or vice versa.

The pressing arrangement 100 comprises a pressure medium circulation flow generator 35, which is configured to provide a circulation of pressure medium within the pressure vessel 1, 16, 17, wherein during the circulation of the pressure medium the pressure medium passes through the furnace chamber 18. In accordance with the embodiment illustrated in FIG. 1, the pressure medium circulation flow generator 35 comprises a fan 35 or the like for circulation of pressure medium within the furnace chamber 18. Further in accordance with the embodiment of the present invention illustrated in FIG. 1, the fan 35 may for example be arranged at an opening in the load compartment 19 above the bottom insulating portion 8 which permits pressure medium flow into or out of the load compartment 19. The pressure medium circulation flow generator 35 is controllable at least with respect to operating rate thereof. The operating rate of the pressure medium circulation flow generator 35 could for example comprise a number of revolutions per minute (rpm) of the pressure medium circulation flow generator 35, such as if it comprises or is constituted by one or more fans, etc., but another or other types of operating rates are contemplated, depending on the nature of the particular implementation of the pressure medium circulation flow generator 35. The pressure medium circulation flow generator 35 may be configured to selectively control the flow rate of pressure medium in the above-mentioned inner convection loop.

The pressing arrangement 100 may possibly comprise one or more valves or any other type of adjustable throttle or pressure medium flow restriction means for selectively and controllably impede or obstruct pressure medium flow in the inner convection loop, i.e. so as to selectively and controllably impede or obstruct pressure medium flow in the inner convection loop or not impede or obstruct pressure medium flow in the inner convection loop. To that end, there may for example be provided one or more valves or any other type of adjustable throttle or pressure medium flow restriction means, schematically indicated at 31 in FIG. 1, in the pressure medium guiding passage formed between the load compartment 19 and the bottom insulating portion 8, as illustrated in FIG. 1. It is to be understood that the position of the valves or any other type of adjustable throttle or pressure medium flow restriction means 31 in FIG. 1 is according to an example, and further that there may be more or less valves or any other type of adjustable throttle or pressure medium flow restriction means 31 than the two illustrated in FIG. 1. In FIG. 1, the elements 31 are illustrated as adjustable throttles, but it is to be understood that each or any of the elements 31 in alternative or in addition could comprise one or more valves or another type of pressure medium flow restriction means.

The pressing arrangement 100 comprises a pressure medium heating device configured to selectively and controllably heat the pressure medium within the pressure vessel 1, 16, 17 for increasing the temperature of the pressure medium in the treatment region 18. In accordance with the embodiment illustrated in FIG. 1, the pressure medium heating device comprises the furnace 36 of the furnace chamber 18, and the pressure medium heating device will in the following be referred to by the reference numeral 36 without any loss of generality. It is to be understood that the pressure medium heating device 36 could be implemented in another way than by way of the furnace 36.

The pressing arrangement 100 comprises at least one sensor, configured to sense at least one temperature in the pressure vessel. In accordance with the embodiment illustrated in FIG. 1, the pressing arrangement 100 comprises two sensors, schematically indicated in FIG. 1 by reference numeral 4, each of which may be configured to sense at least one temperature in the pressure vessel 1, 16, 17 at a plurality of time instants. Although two sensors 4 are illustrated in FIG. 1, it is to be understood that the pressing arrangement 100 may comprise more or fewer than two sensors, such as one sensor, or three, four, five or more sensors. Each sensor may be configured to sense at least one temperature in the pressure vessel 1, 16, 17, possibly at different locations therein, and at a plurality of time instants. As illustrated in FIG. 1, the sensors 4 (or one of several sensors that may be arranged in the pressing arrangement 100) may for example be arranged within the treatment region 18, which in accordance with the illustrated embodiment in FIG. 1 is defined by an interior of the furnace chamber 18. In accordance with the embodiment of the present invention illustrated in FIG. 1, one of the two sensors 4 is arranged in the pressure medium guiding passage 12 between the walls of the load compartment 19 and the heat insulating portion 7, and the other one of the two sensors 4 is arranged within the load compartment 19. Each of the sensors 4 may be configured to sense at least one temperature in the treatment region 18 at a plurality of time instants. It is however to be understood that, in alternative or in addition, any of the sensors 4 and/or any other sensor that may be provided, may be arranged not in the treatment region 18 but instead elsewhere within the pressure vessel 1, 16, 17, for example. For example in such a case, the sensor 4 and/or any other sensor that may be provided could possibly be configured to sense at least one temperature in the vicinity of the treatment region 18, and based thereon derive at least one temperature in the treatment region 18 possibly at a plurality of time instants.

It is to be understood that the sensors 4 may not only be capable of sensing temperature. Any of the sensors 4 and/or any other sensor that may be provided could be configured to sense, e.g., pressure.

The pressing arrangement 100 comprises at least one control and processing module, schematically indicated in FIG. 1 by reference numeral 6. Although only one control and processing module 6 is illustrated in FIG. 1, it is to be understood that the pressing arrangement 100 may comprise more than one control and processing module. The control and processing module 6 is communicatively coupled with the sensors 4 (or with each or any of several sensors that may be arranged in the pressing arrangement 100) and with the pressure medium circulation flow generator 35 and the pressure medium heating device 36 for controlling operation of the pressure medium circulation flow generator 35 and the pressure medium heating device 36, respectively, for controlling the rate of cooling of the pressure medium in the treatment region 18.

The communicative coupling between the control and processing module 6 and the sensors 4 (or with each or any of several sensors that may be arranged in the pressing arrangement 100), the pressure medium circulation flow generator 35 and the pressure medium heating device 36, respectively, may be realized or implemented for example by means of any appropriate wired and/or wireless communication means or techniques as known in the art (not shown in FIG. 1).

The control and processing module 6 is configured to, during a cooling phase:
- obtain values indicative of at least one temperature in the treatment region 18 at a plurality of time instants (e.g., from each or any of the sensors 4, which may be configured to produce the values by carrying out sensing operations);
- based on the obtained values, determine a cooling power for cooling of the pressure medium in the treatment region 18;
- determine a difference between a required cooling power required to obtain a selected value for the rate of cooling of the pressure medium in the treatment region 18 and the determined cooling power; and
- based on the determined difference, control the operating rate of the pressure medium circulation flow generator 35 so that a difference between the cooling power for cooling of the pressure medium in the treatment region 18 and the required cooling power decreases.

During the cooling phase, if (e.g., when or whenever) the cooling power for cooling of the pressure medium in the treatment region 18 provided by the operation of the pressure medium circulation flow generator 35 exceeds a cooling power corresponding to the selected value for the rate of cooling of the pressure medium in the treatment region 18, the control and processing module 6 is configured to, based on the determined difference, heat the pressure medium in the treatment region 18 using the pressure medium heating device 36 so that a difference between the cooling power of cooling of the pressure medium in the treatment region 18 and the required cooling power decreases.

The control and processing module 6 may be configured to determine that the cooling power for cooling of the pressure medium in the treatment region 18 provided by the operation of the pressure medium circulation flow generator 35 exceeds a cooling power corresponding to the selected value for the rate of cooling of the pressure medium in the treatment region 18. Responsive to this determination, the control and processing module 6 may be configured to, based on the determined difference, heat the pressure medium in the treatment region 18 using the pressure medium heating device 36 so that a difference between the cooling power of cooling of the pressure medium in the treatment region 18 and the required cooling power decreases.

As mentioned, in accordance with the embodiment illustrated in FIG. 1, the pressure medium circulation flow generator 35 comprises a fan 35, which may have a controllable number of revolutions per minute (rpm). The operating rate of the pressure medium circulation flow generator 35 may in such a case comprise or be constituted by the number of rpm of the fan 35.

The pressing arrangement 100 may comprise a pressure medium supplying device, which may be configured to selectively and controllably transport pressure medium during the cooling phase from another region in the pressing arrangement 100 to the treatment region 18 (i.e. from another region than the treatment region 18), wherein the temperature of the pressure medium in the other region is lower than the temperature of the pressure medium in the treatment region 18 during at least part of the cooling phase, for decreasing the temperature of the pressure medium in the treatment region 18 by transport of pressure medium during the cooling phase from the other region to the treatment region 18. The pressure medium supplying device may be controllable at least with respect to pressure medium supplying rate.

The control and processing module 6 may be communicatively coupled with the pressure medium supplying device for controlling operation thereof, for controlling the rate of cooling of the pressure medium in the treatment region 18. The communicative coupling between the control and processing module 6 and the pressure medium supplying device may be realized or implemented for example by means of any appropriate wired and/or wireless communication means or techniques as known in the art (not shown in FIG. 1).

During the cooling phase, if (e.g., when or whenever) the maximally possible cooling power for cooling of the pressure medium in the treatment region 18 provided by the operation of the pressure medium circulation flow generator is below a cooling power corresponding to the selected value for the rate of cooling of the pressure medium in the treatment region 18, the control and processing module 6 may be configured to, based on the determined difference, control the pressure medium supplying rate of the pressure medium supplying device so that a difference between the cooling power for cooling of the pressure medium in the treatment region 18 and the required cooling power decreases.

The control and processing module 6 may be configured to determine that the maximally possible cooling power for cooling of the pressure medium in the treatment region 18 provided by the operation of the pressure medium circulation flow generator is below a cooling power corresponding to the selected value for the rate of cooling of the pressure medium in the treatment region 18. Responsive to this determination, the control and processing module 6 may be configured to, based on the determined difference, control the pressure medium supplying rate of the pressure medium supplying device so that a difference between the cooling power for cooling of the pressure medium in the treatment region 18 and the required cooling power decreases.

The above-mentioned other region may for example be defined by a region within the pressure vessel 1, 16, 17 that is different and possibly at a distance from the treatment region 18. As mentioned in the foregoing, an outer cooling loop may be formed by at least the pressure medium guiding passage 10 and the pressure medium guiding passage 11. The above-mentioned other region in the pressing arrangement 100 may for example comprise at least a part of the outer cooling loop.

For example, the above-mentioned other region, from which the pressure medium supplying device may transport pressure medium to the treatment region 18 during the cooling phase, may for example be defined at least in part by the space 26 illustrated in FIG. 1, which space 26 may form part of the outer cooling loop. Pressure medium which enters into the space 26 between the bottom insulating portion 8 and the bottom end closure 16 after having been guided in the pressure medium guiding passage 10 may be guided towards and into the furnace chamber, or treatment region, 18 via the pressure medium guiding passage 28. Thereby, the pressure medium supplying device may be configured to transport pressure medium during the cooling phase from the space 26, in which the temperature of the pressure medium is relatively cool after having been guided in, e.g., the pressure medium guiding passage 10 in proximity to an inner surface of walls of the pressure cylinder 1 to the treatment region 18. For example, by guiding pressure medium in the pressure medium guiding passage 10 in proximity to an inner surface of walls of the pressure cylinder 1, transfer of heat from the pressure medium to the outside of the pressure vessel 1, 16, 17 (or pressure cylinder 1) may take place via the walls of the pressure cylinder 1. Thereby, the temperature of the pressure medium in the outer cooling loop may be lower than the temperature of the pressure medium in the treatment region 18. To increase the transfer of heat from the pressure medium guided in proximity to an inner surface of walls of the pressure cylinder 1 to the outside of the pressure cylinder 1, the outer surface of the outer walls of the pressure vessel 1, 16, 17 (or pressure cylinder) may, as mentioned above, be provided with channels, conduits or tubes, etc. (not shown in FIG. 1) for coolant, whereby the walls of the pressure vessel 1, 16, 17 may be cooled in order to protect the walls from detrimental heat building up during operation of the pressure vessel 1, 16, 17. The coolant in the channels, conduits or tubes may for example comprise water, but another or other types of coolants are possible.

It is to be understood that the arrangement of the above-mentioned other region as described above is according to an example, and that variations are possible. For example, the above-mentioned other region must not necessarily be a region within the pressure vessel 1, 16, 17, but could, in alternative or in addition, be a region in the pressing arrangement 100 outside the pressure vessel 1, 16, 17, such as, for example a region defined by a pressure medium source (e.g., comprising a tank or reservoir of pressure medium) that may be arranged outside the pressure vessel 1, 16, 17, which pressure medium source may be fluidly connected with the pressure vessel 1, 16, 17.

Different implementations of the pressure medium supplying device to achieve a selective and controllable transport of pressure medium during the cooling phase from the other region to the treatment region 18 are possible.

For example, in accordance with the embodiment illustrated in FIG. 1, the pressure medium supplying device may comprise a pressure medium flow generator, which, as illustrated in FIG. 1, for example may comprise a fan 37. The fan 37 may have a controllable number of rpm so as to provide for a controllability of the pressure medium supplying device with respect to pressure medium supplying rate. Another or other types of operating parameters than the number of rpm are contemplated, depending on the nature of the particular implementation of the pressure medium flow generator (e.g., if it would not comprise or be constituted by one or more fans, etc., but instead another or other types of pressure medium flow generators).

It is to be noted that at least part of the functionality of the pressure medium supplying device may possibly be provided by the pressure medium circulation flow generator 35, or vice versa. For example, there may possibly be one device, which may be referred to as pressure medium flow generator or a pressure medium circulation generator, that may be configured so as to provide both the functionality of the pressure medium supplying device as described herein and the functionality the pressure medium circulation flow generator as described herein.

For example, the fan 37 (or pressure medium flow generator) of the pressure medium supplying device illustrated in FIG. 1 could be omitted, and the fan 35 (or pressure medium circulation flow generator 35) could be arranged and/or configured so as to be capable of also providing the functionality of the fan 37, e.g., so as to provide for a controllability of the pressure medium supplying rate of transport of pressure medium during the cooling phase from the other region to the treatment region 18. The same applies to the embodiments illustrated in FIGS. 3 and 4 that will be described in the following.

Further in accordance with the embodiment illustrated in FIG. 1, the pressure medium supplying device may comprise a pressure medium guiding passage 28 within the pressure vessel 1, 16, 17. As illustrated in FIG. 1, the fan 37 of the pressure medium flow generator may be arranged within the pressure medium guiding passage 28. The pressure medium guiding passage 28 may be arranged such that the other region is in fluid communication with the treatment region 18 by means of the pressure medium guiding passage 28, wherein the pressure medium supplying device may be configured to selectively and controllably transport pressure medium from the other region to the treatment region 18 via the pressure medium guiding passage 28. As already described in the foregoing, the pressure medium guiding passage 28 may comprise a conduit 28, and may be arranged so as to extend through the bottom insulating portion 8, with a lower (or first) opening of the pressure medium guiding passage or conduit 28 below the bottom insulating portion 8 (and possibly within the space 26, as per the illustrated embodiment) and an upper (or second) opening of the pressure medium guiding passage or conduit 28 above the bottom insulating portion 8 (and possibly aligned with an opening in the load compartment 19, as per the illustrated embodiment).

The pressure medium supplying device may comprise pressure medium flow restriction means 38, 40, which may be configured to selectively and controllably impede or obstruct pressure medium flow in the pressure medium guiding passage 28, whereby pressure medium flow between the other region and the treatment region 18 can be selectively impeded or obstructed or not impeded or obstructed by the pressure medium flow restriction means 38, 40. In accordance with the embodiment illustrated in FIG. 1, the pressure medium flow restriction means comprises adjustable throttles or adjustable valves 38, 40.

As indicated in FIG. 1, the pressure medium flow generator and the pressure medium flow restriction means 38, 40 may operate in conjunction so as to provide for a controllability of the pressure medium supplying device with respect to pressure medium supplying rate thereof.

As mentioned, the pressure medium guiding passage 28 illustrated in FIG. 1 comprises a conduit 28. The conduit 28 extends from the other region to or towards the treatment region 18. The pressure medium guiding passage 28 comprises openings 39, 41 which are comprised in the conduit 28. The openings 39, 41 provide fluid communication between the other region and an interior 42 of the conduit 28, wherein pressure medium from the other region entering the interior of the conduit 28 can be transported to the treatment region 18 via the conduit 28. As illustrated in FIG. 1, the pressure medium flow restriction means 38, 40 may be arranged at least in part in the openings 39, 41 and may be configured to selectively and controllably impede or obstruct pressure medium flow between the other region and the interior 42 of the conduit 28 via the openings 39, 41. Each of several openings in the conduit 28 may be associated with a respective pressure medium flow restriction means. As illustrated in FIG. 1, the opening 39 is associated with the pressure medium flow restriction means 38, and the opening 41 is associated with the pressure medium flow restriction means 40. Thus, the pressure medium flow restriction means 38 may be configured to selectively and controllably impede or obstruct pressure medium flow between the other region and the interior 42 of the conduit 28 via the opening 39, and the pressure medium flow restriction means 40 may be configured to selectively and controllably impede or obstruct pressure medium flow between the other region and the interior 42 of the conduit 28 via the opening 41. As illustrated in FIG. 1, the fan 37 or pressure medium flow generator of the pressure medium supplying device may be arranged within the pressure medium guiding passage 28 between the openings 39, 41 and the upper (or second) opening of the pressure medium guiding passage 28 (or upstream the openings 39, 41).

As noted in the foregoing, different implementations of the pressure medium supplying device to achieve a selective and controllable transport of pressure medium during the cooling phase from the other region to the treatment region 18 are possible. For example, in alternative or in addition to the pressure medium guiding passage 28 comprising openings 39, 41 comprised in the conduit 28, with the pressure medium flow restriction means 38, 40 being arranged at least in part in the openings 39, 41, the pressure medium supplying device could comprise a first pressure medium passage and at least one second pressure medium passage, each of which may have opposite open ends. One end of the first pressure medium passage may be in or in proximity to the treatment region 18, and another end of the first pressure medium passage may be in fluid connection with one end of the at least one second pressure medium passage via pressure medium flow restriction means (e.g., comprising one or more adjustable throttles or adjustable valves). Another end of the at least one second pressure medium passage may be in the other region. Possibly, the other end of the first pressure medium passage may be in fluid connection with one end of each or any of a plurality of second pressure medium passages via pressure medium flow restriction means (e.g., comprising one or more adjustable throttles or adjustable valves). If there are plurality of second pressure medium passages, the ends thereof that are in the other region may be distributed within the other region and arranged at a distance from each other. Such a configuration may facilitate achieving a relatively even flow of pressure medium being transported from the other region to the treatment region 18.

Figure 2:
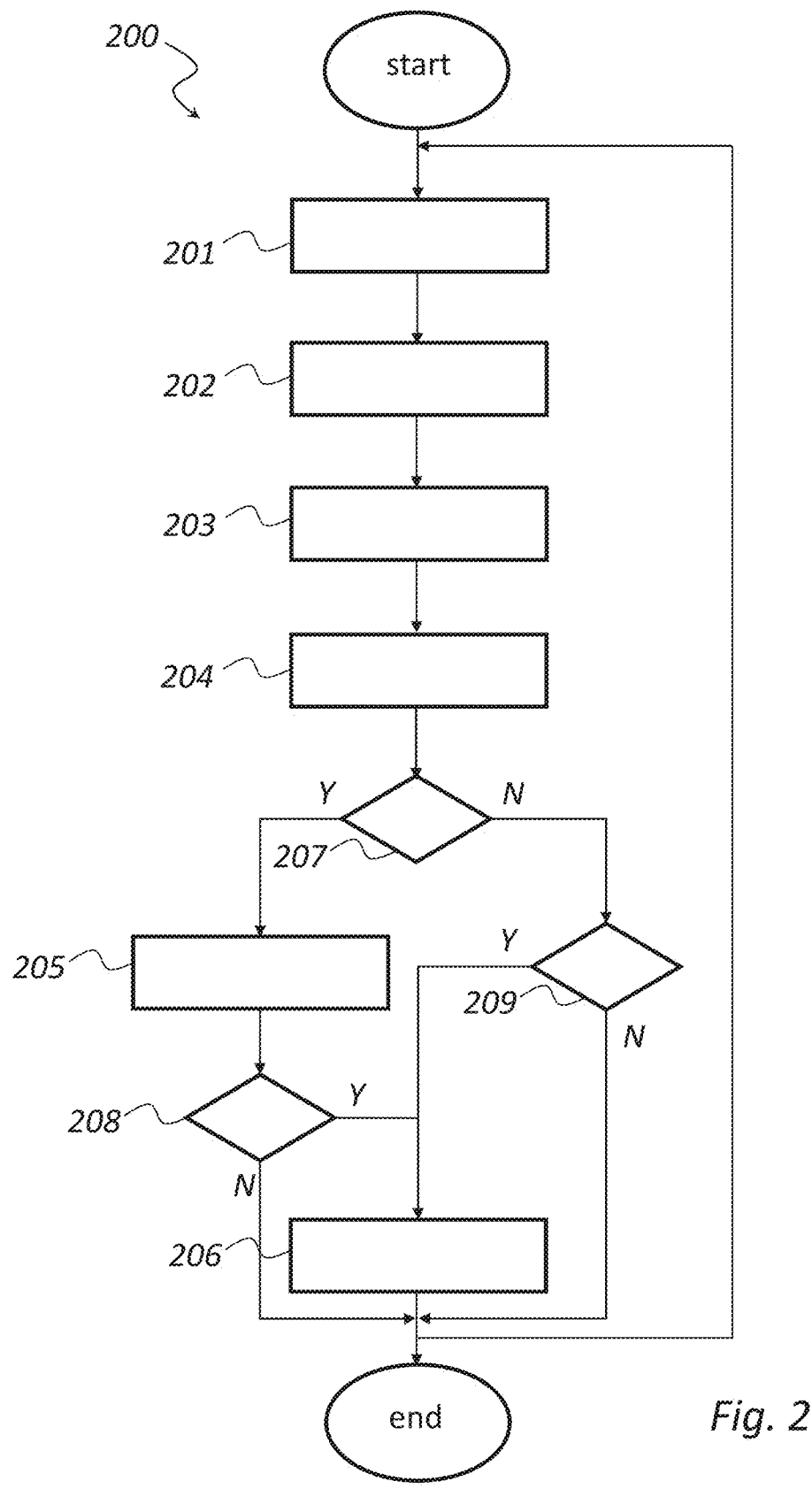
FIG. 2 is a schematic flowchart of a method according to an embodiment of the present invention.

FIG. 2 is a schematic flowchart of a method 200 according to an embodiment of the present invention. The method 200 is implemented in a pressing arrangement, such as, for example, a pressing arrangement 100 as described in the foregoing with reference to FIG. 1. The pressing arrangement comprises a pressure vessel, which is arranged to hold pressure medium therein during use of the pressing arrangement. The pressing arrangement comprises a furnace chamber, which is arranged within the pressure vessel, and which is arranged so that pressure medium can enter and exit the furnace chamber. A treatment region is at least in part defined by the furnace chamber, wherein the treatment region is arranged to accommodate an article. The pressing arrangement is configured to subject the article to a treatment cycle including a cooling phase. The pressing arrangement comprises a pressure medium heating device configured to selectively and controllably heat the pressure medium within the pressure vessel for increasing the temperature of the pressure medium in the treatment region. The pressing arrangement comprises a pressure medium circulation flow generator, which is configured to provide a circulation of pressure medium within the pressure vessel, wherein during the circulation of the pressure medium the pressure medium passes through the furnace chamber. The pressure medium circulation flow generator is controllable at least with respect to operating rate thereof.

The method 200 is for controlling the rate of cooling of the pressure medium in the treatment region. The method 200 may for example be implemented or carried out in or using a control and processing unit, e.g., a control and processing unit 6 as described in the foregoing with reference to FIG. 1.

The method 200 comprises the steps 201, 202, 203 and 204, and possibly one or more of the steps 205, 206 and 207. These steps, which are carried out during the cooling phase, will be further described in the following.

At 201, values indicative of at least one temperature in the treatment region at a plurality of time instants are obtained.

At 202, based on the obtained values, a cooling power for cooling of the pressure medium in the treatment region is determined.

At 203, a difference between a required cooling power required to obtain a selected value for the rate of cooling of the pressure medium in the treatment region and the determined cooling power is determined.

At 204, based on the determined difference, the operating rate of the pressure medium circulation flow generator is controlled so that a difference between the cooling power for cooling of the pressure medium in the treatment region and the required cooling power decreases.

If the cooling power for cooling of the pressure medium in the treatment region provided by the operation of the pressure medium circulation flow generator exceeds a cooling power corresponding to the selected value for the rate of cooling of the pressure medium in the treatment region, at 205, the pressure medium in the treatment region is heated based on the determined difference using the pressure medium heating device so that a difference between the cooling power of cooling of the pressure medium in the treatment region and the required cooling power decreases.

To that end, at 207, it may be determined whether the cooling power for cooling of the pressure medium in the treatment region provided by the operation of the pressure medium circulation flow generator exceeds a cooling power corresponding to the selected value for the rate of cooling of the pressure medium in the treatment region. If it is determined that the cooling power for cooling of the pressure medium in the treatment region provided by the operation of the pressure medium circulation flow generator exceeds a cooling power corresponding to the selected value for the rate of cooling of the pressure medium in the treatment region, then the method 200 may proceed via "Y" to 205, at which the pressure medium in the treatment region is heated based on the determined difference using the pressure medium heating device so that a difference between the cooling power of cooling of the pressure medium in the treatment region and the required cooling power decreases.

The pressing arrangement may comprise a pressure medium supplying device. The pressure medium supplying device may be configured to selectively and controllably transport pressure medium during the cooling phase from another region in the pressing arrangement to the treatment region, wherein the temperature of the pressure medium in the other region is lower than the temperature of the pressure medium in the treatment region during at least part of the cooling phase for decreasing the temperature of the pressure medium in the treatment region by transport of pressure medium during the cooling phase from the other region to the treatment region. The pressure medium supplying device may be controllable at least with respect to pressure medium supplying rate.

If the maximally possible cooling power for cooling of the pressure medium in the treatment region provided by the operation of the pressure medium circulation flow generator is below a cooling power corresponding to the selected value for the rate of cooling of the pressure medium in the treatment region, the pressure medium supplying rate of the pressure medium supplying device may be controlled based on the determined difference so that a difference between the cooling power for cooling of the pressure medium in the treatment region and the required cooling power decreases.

To that end, subsequent to 205, the method 200 may proceed to 208, at which it is determined whether the maximally possible cooling power for cooling of the pressure medium in the treatment region provided by the operation of the pressure medium circulation flow generator is below a cooling power corresponding to the selected value for the rate of cooling of the pressure medium in the treatment region. If it is determined that the maximally possible cooling power for cooling of the pressure medium in the treatment region provided by the operation of the pressure medium circulation flow generator is below a cooling power corresponding to the selected value for the rate of cooling of the pressure medium in the treatment region, then the method 200 may proceed via "Y" to 206, at which the pressure medium supplying rate of the pressure medium supplying device is controlled based on the determined difference so that a difference between the cooling power for cooling of the pressure medium in the treatment region and the required cooling power decreases.

If it is determined at 208 that the maximally possible cooling power for cooling of the pressure medium in the treatment region provided by the operation of the pressure medium circulation flow generator is not below a cooling power corresponding to the selected value for the rate of cooling of the pressure medium in the treatment region, then the method 200 may proceed via "N", at which the method 200 may possibly end.

If it is determined at 207 that the cooling power for cooling of the pressure medium in the treatment region provided by the operation of the pressure medium circulation flow generator does not exceed a cooling power corresponding to the selected value for the rate of cooling of the pressure medium in the treatment region, then the method 200 may proceed via "N" to 209, at which it is determined, just as at 208, whether the maximally possible cooling power for cooling of the pressure medium in the treatment region provided by the operation of the pressure medium circulation flow generator is below a cooling power corresponding to the selected value for the rate of cooling of the pressure medium in the treatment region. If it is determined that the maximally possible cooling power for cooling of the pressure medium in the treatment region provided by the operation of the pressure medium circulation flow generator is below a cooling power corresponding to the selected value for the rate of cooling of the pressure medium in the treatment region, then the method 200 may proceed via "Y" to 206, at which the pressure medium supplying rate of the pressure medium supplying device is controlled based on the determined difference so that a difference between the cooling power for cooling of the pressure medium in the treatment region and the required cooling power decreases.

If it is determined at 209 that the maximally possible cooling power for cooling of the pressure medium in the treatment region provided by the operation of the pressure medium circulation flow generator is not below a cooling power corresponding to the selected value for the rate of cooling of the pressure medium in the treatment region, then the method 200 may proceed via "N", at which the method 200 may possibly end.

As indicated in FIG. 2 by the line just before "end" going back to immediately after "start", the sequence of steps illustrated in FIG. 2 may be carried out repeatedly, e.g., over a certain period of time, for example so as to control the rate of cooling of the pressure medium in the treatment region to keep the rate of cooling of the pressure medium in the treatment region within a selected or predefined rate range or at a selected or predefined rate, e.g., over a period of time. Accordingly, the method 200 may comprise or constitute a control loop mechanism for controlling the rate of cooling of the pressure medium in the treatment region to be within a predefined rate range or at a selected rate, e.g., over a period of time.

FIG. 3 is a schematic, in part sectional, side view of a pressing arrangement 100 according to an embodiment of the present invention. The pressing arrangement 100 illustrated in FIG. 3 is similar to the pressing arrangement 100 illustrated in FIG. 1, and the same reference numerals indicate the same or similar components, having the same or similar function. The pressing arrangement 100 illustrated in FIG. 3 differs from the pressing arrangement 100 illustrated in FIG. 1 in that the pressing arrangement 100 illustrated in FIG. 3 further comprises a heat exchanging element 170, which is arranged in the top end closure 17 of the pressure vessel 1, 16, 17. The heat exchanging element 170 comprises a circuit 180 for allowing a circulation of cooling medium within the circuit 180 of the heat exchanging element 170 for a cooling of pressure medium arranged to pass through the heat exchanging element 170 in the top end closure 17. The pressure medium may, from the opening of the housing 2, pass through a passage 200 of the heat exchanging element 170 arranged in the top end closure 17. More specifically, the pressure medium may enter the passage 200 via an inlet 205 of the passage 200 at a central portion of the heat exchanging element 170, and exit the passage 200 via an outlet 210 at a peripheral portion of the heat exchanging element 170. Thereafter, the pressure medium may enter into the pressure medium guiding passage 10. It will be appreciated that pressure medium entering the heat exchanging element 170 may come into a relatively close thermal contact with the heat exchanging element 170 being cooled by the cooling medium passing through the circuit 180 thereof. Hence, the pressure medium may be cooled efficiently and/or quickly by the heat exchanging element 170. The circuit 180 of the heat exchanging element 170 may comprise an inlet tube 185 which may be in fluid connection with the circuit 180 via channels 197 for a supply of cooling medium to the circuit 180. Analogously, the circuit 180 may comprise an outlet tube 195 which may be in fluid connection with the circuit 180 for a discharge of cooling medium from the circuit 180. During operation of the heat exchanging element 170, the cooling medium can be made to circulate within the circuit 180 of the heat exchanging element 170 for a heat transfer or cooling of the pressure medium passing the top end closure 17. As the temperature of the cooling medium may be significantly lower than the temperature of the pressure medium, there is a transfer of cold from the cooling medium to the pressure medium, or analogously, a transfer of heat from the pressure medium to the cooling medium. It will be appreciated that the heat exchanging element 170 as described in FIG. 3 is schematic, and that other configurations and variations are possible. For example, the heat exchanging element 170 may alternatively be arranged in the bottom end closure 16 with the same or a similar circuit 180 as in the top end closure 17.

In FIG. 3, the elements 31 are illustrated as valves (e.g., adjustable valves), but it is to be understood that each or any of the elements 31 in alternative or in addition could comprise one or more adjustable throttles or another type of pressure medium flow restriction means.

FIG. 4 is a schematic, in part sectional, side view of a pressing arrangement 100 according to an embodiment of the present invention. The pressing arrangement 100 illustrated in FIG. 4 is similar to the pressing arrangement 100 illustrated in FIG. 3, and the same reference numerals indicate the same or similar components, having the same or similar function. The pressing arrangement 100 illustrated in FIG. 4 differs from the pressing arrangement 100 illustrated in FIG. 3 in that the pressing arrangement 100 illustrated in FIG. 4 further comprises a heat absorbing element, or heat-absorbing body, 20. The heat absorbing element 20 is arranged within the pressure vessel 1, 16, 17 and is configured to absorb heat from the pressure medium. At least a portion or part of the heat absorbing element 20 may for example be made of metal, or another material having a relatively high thermal conductivity.

The pressure medium guiding passage 11 is arranged to guide the pressure medium after having exited the furnace chamber 18 towards the top end closure 17 to a space between the top end closure 17 and the furnace chamber 18 in which the heat absorbing element 20 is arranged. The heat absorbing element 20 may be suspended or arranged within the space between the top end closure 17 and the furnace chamber 18 for example by means of one or more supporting structures (not shown in FIG. 4), which supporting structure(s) for example may be attached to the heat insulated casing 3. As illustrated in FIG. 4, the pressure medium may exit the load compartment 19 and subsequently be guided in a pressure medium guiding passage between the walls of the load compartment 19 and the heat insulating portion 7, after which the pressure medium may enter into the pressure medium guiding passage 11 by way of openings 14 between the heat insulating portion 7 and the housing 2. The openings 14 between the heat insulating portion 7 and the housing 2 may possibly be provided with valves or any other type of adjustable throttle or pressure medium flow restriction means.

The heat absorbing element 20 comprises a plurality of inlets 21 which permit the pressure medium that has exited the furnace chamber 18 to enter into an interior 22 of the heat absorbing element 20. The heat absorbing element 20 is configured so as to permit pressure medium to be guided through the heat absorbing element 20 towards a plurality of outlets 23 of the heat absorbing element 20. The plurality of outlets 23 permit the pressure medium to exit the heat absorbing element 20. The inlets 21 are arranged on a first side 24 of the heat absorbing element 20 and the outlets 23 are arranged on a second side 25 of the heat absorbing element 20. It is to be understood that it is not necessary to have a plurality of inlets 21 and a plurality of outlets 23. Possibly, there could be only one inlet 21 on the first side 24 of the heat absorbing element 20, and there could possibly be only one outlet 23 on the second side 25 of the heat absorbing element 20.

The second side 25 of the heat absorbing element 20 is facing in a direction towards an inner surface of the top end closure 17, for example such as illustrated in FIG. 4. As further illustrated in FIG. 4, the heat absorbing element 20 may be arranged such that the first side 24 of the heat absorbing element 20 is opposite to the second side 25 of the heat absorbing element 20.

In accordance with the embodiment of the present invention illustrated in FIG. 1, the heat absorbing element 20 is at least partly enclosed by the housing 2 such that there is a space between the second side 25 of the heat absorbing element 20 and a portion of the housing 2 into which space the pressure medium having exited the heat absorbing element 20 may enter.

After the pressure medium has been guided through the heat absorbing element 20, it passes through the guiding passage 200 of the heat exchanging element 170 arranged in the top end closure 17, for example such as described in the foregoing with reference to FIG. 3. Hence, there may be a cooling of the pressure medium both via the 'passive' heat absorbing element 20 and the 'active' heat exchanging element 170.

The heat exchanging element 170 may be omitted in the pressing arrangement 100 illustrated in FIG. 4. The top end closure 17 may then be arranged for example such as illustrated in FIG. 1. In that case, the pressure medium having exited the heat absorbing element 20 at the second side 25 thereof can be guided via an opening in the housing 2, e.g., an opening in the housing 2 similar to the opening in the housing 2 into the inlet 205 of the passage 200 illustrated in FIG. 4, to a pressure medium guiding passage defined by the space in part defined by the inner surface of the top end closure 17 and the pressure medium guiding passage 10.

Compared to FIGS. 1 and 3, in FIG. 4 the elements 31 illustrated in FIGS. 1 and 3 have been omitted. However, it is to be understood that elements 31, e.g., comprising one or more valves (e.g., adjustable valves), adjustable throttles and/or some other type of pressure medium flow restriction means, could be arranged in the pressing arrangement 100 illustrated in FIG. 4, similar to or in the same way as in the pressing arrangement 100 illustrated in FIG. 1 or 3.

Further compared to FIGS. 1 and 3, in FIG. 4 the fan 37 or pressure medium flow generator of the pressure medium supplying device illustrated in FIGS. 1 and 3 has been omitted. However, it is to be understood that it could be arranged in the pressing arrangement 100 illustrated in FIG. 4, similar to or in the same way as in the pressing arrangement 100 illustrated in FIG. 1 or 3.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of operating a pressing arrangement, the pressing arrangement including a pressure vessel configured to hold pressure medium therein during use of the pressing arrangement, and a furnace chamber within the pressure vessel, the furnace chamber configured to direct the pressure medium to enter and exit the furnace chamber, wherein a treatment region is at least in part defined by the furnace chamber, wherein the treatment region is configured to accommodate an article, and wherein the pressing arrangement is configured to subject the article to a treatment cycle including a cooling phase, wherein the pressing arrangement includes a pressure medium heating device configured to selectively and controllably heat the pressure medium within the pressure vessel to increase a temperature of the pressure medium in the treatment region, and wherein the pressing arrangement further includes a pressure medium circulation flow generator configured to provide a circulation of the pressure medium within the pressure vessel, wherein the pressure medium passes through the furnace chamber during the circulation of the pressure medium, the pressure medium circulation flow generator being controllable at least with respect to an operating rate thereof, the method being for controlling a rate of cooling of the pressure medium in the treatment region, the method comprising:

obtaining values indicative of at least one temperature in the treatment region at a plurality of time instants during the cooling phase;

based on the obtained values, determining a cooling power for cooling of the pressure medium in the treatment region during the cooling phase;

determining a difference between a required cooling power required to obtain a selected value for the rate of cooling of the pressure medium in the treatment region and the determined cooling power during the cooling phase;

based on the determined difference, controlling the operating rate of the pressure medium circulation flow generator so that a difference between the cooling power for cooling of the pressure medium in the treatment region and the required cooling power decreases during the cooling phase; and in response to a determination that the cooling power for cooling of the pressure medium in the treatment region provided by operation of the pressure medium circulation flow generator exceeds a cooling power corresponding to the selected value for the rate of cooling of the pressure medium in the treatment region, heating the pressure medium in the treatment region using the pressure medium heating device and based on the determined difference so that the difference between the cooling power for cooling of the pressure medium in the treatment region and the required cooling power decreases during the cooling phase.

2. The method according to claim 1, wherein the pressing arrangement further comprises a pressure medium supplying device configured to selectively and controllably transport pressure medium from another region in the pressing arrangement to the treatment region during at least part of the cooling phase, wherein a temperature of the pressure medium in the other region is lower than the temperature of the pressure medium in the treatment region during the at least part of the cooling phase, to decrease the temperature of the pressure medium in the treatment region by transport of pressure medium during the cooling phase from the other region to the treatment region, wherein the pressure medium supplying device is controllable at least with respect to pressure medium supplying rate, the method further comprising, during the cooling phase, in response to a determination that a maximally possible cooling power for cooling of the pressure medium in the treatment region provided by the operation of the pressure medium circulation flow generator is below the cooling power corresponding to the selected value for the rate of cooling of the pressure medium in the treatment region, controlling the pressure medium supplying rate of the pressure medium supplying device based on the determined difference so that the difference between the cooling power for cooling of the pressure medium in the treatment region and the required cooling power decreases.

3. The method according to claim 1, wherein the pressure medium circulation flow generator comprises a fan having a controllable number of revolutions per minute, rpm, the operating rate of the pressure medium circulation flow generator comprising the rpm, the method further comprising:

in response to a determination that the determined cooling power exceeds a predefined cooling power threshold value during at least a predefined length of time, decreasing the rpm of the fan by a selected percentage of a current rpm of the fan or to a selected value of the rpm of the fan during a selected period of time.

4. The method according to claim 1, wherein the pressure medium circulation flow generator comprises a fan having a controllable number of revolutions per minute, rpm, the operating rate of the pressure medium circulation flow generator comprising the rpm, the method further comprising:

increasing the rpm of the fan by a selected percentage of a current rpm of the fan or to a selected value of the rpm of the fan during a period of time; and heating the pressure medium in the treatment region using the pressure medium heating device so as maintain the temperature of the pressure medium in the treatment region within a selected temperature range over the period of time.

5. The method according to claim 2, wherein the pressure medium supplying device comprises at least one pressure medium guiding passage within the pressure vessel, the at least one pressure medium guiding passage being arranged such that the other region is in fluid communication with the treatment region by means of the at least one pressure medium guiding passage, wherein the pressure medium supplying device is configured to selectively and controllably transport pressure medium from the other region to the treatment region via the at least one pressure medium guiding passage, and wherein the pressure medium supplying device further comprises a pressure medium flow restriction assembly configured to selectively and controllably impede or obstruct pressure medium flow in the at least one pressure medium guiding passage, whereby pressure medium flow between the other region and the treatment region can be selectively impeded or obstructed or not impeded or obstructed by the pressure medium flow restriction assembly, the pressure medium flow restriction assembly including one or more adjustable throttles, one or more adjustable valves, or any combination thereof; and wherein the controlling of the pressure medium supplying rate of the pressure medium supplying device comprises controlling the pressure medium flow restriction assembly so that the pressure medium flow between the other region and the treatment region is impeded or obstructed or not impeded or obstructed by the pressure medium flow restriction assembly.

6. The method according to claim 5, wherein a sequence of steps including the obtaining of values indicative of the at least one temperature in the treatment region at the plurality of time instants, the determination of the cooling power for cooling of the pressure medium in the treatment region based on the obtained values, the determination of the difference between the required cooling power required to obtain the selected value for the rate of cooling of the pressure medium in the treatment region and the determined cooling power, and the controlling of the operating rate of the pressure medium circulation flow generator, the controlling of the pressure medium supplying rate of the pressure medium supplying device and/or the heating of the pressure medium in the treatment region using the pressure medium heating device based on the determined difference are carried out repeatedly, and wherein the method includes variation, between different times the sequence of steps are carried out, of at least one of a length of at least one first period of time, a length of at least one second period of time, and a length of a continuous period of time in which the at least one first period of time and the at least one second period of time are alternating.

7. The method according to claim 6, wherein the pressure medium flow restriction assembly comprises at least a first pressure medium flow restriction assembly and a second pressure medium flow restriction assembly, wherein each of the first pressure medium flow restriction assembly and the second pressure medium flow restriction assembly is configured to selectively and controllably impede or obstruct the pressure medium flow in the at least one pressure medium guiding passage, whereby the pressure medium flow between the other region and the treatment region can be selectively impeded or obstructed or not impeded or obstructed by each of the first pressure medium flow restriction assembly and the second pressure medium flow restriction assembly, wherein the controlling of the pressure medium supplying rate of the pressure medium supplying device comprises:

controlling the first pressure medium flow restriction assembly so that the pressure medium flow in the at least one pressure medium guiding passage between the other region and the treatment region is impeded or obstructed by the first pressure medium flow restriction assembly during the at least one first period of time and so that the pressure medium flow in the at least one pressure medium guiding passage between the other region and the treatment region is not impeded or obstructed by the first pressure medium flow restriction assembly during the at least one second period of time, wherein the at least one first period of time and the at least one second period of time are alternating in sequence and contiguous so as to form the continuous period of time in which the at least one first period of time and the at least one second period of time are alternating; and controlling the second pressure medium flow restriction assembly so that the pressure medium flow in the at least one pressure medium guiding passage between the other region and the treatment region is not impeded or obstructed by the second pressure medium flow restriction assembly at least during the continuous period of time.

8. The method according to claim 7, wherein the pressure medium supplying device comprises at least a first pressure medium guiding passage and a second pressure medium guiding passage within the pressure vessel, each of the first pressure medium guiding passage and the second pressure medium guiding passage being arranged such that the other region is in fluid communication with the treatment region by means of the respective pressure medium guiding passage, wherein the first pressure medium flow restriction assembly is configured to selectively and controllably impede or obstruct pressure medium flow in the first pressure medium guiding passage and the second pressure medium flow restriction assembly is configured to selectively and controllably impede or obstruct pressure medium flow in the second pressure medium guiding passage wherein the controlling of the pressure medium supplying rate of the pressure medium supplying device comprises:

controlling the first pressure medium flow restriction assembly so that the pressure medium flow in the first pressure medium guiding passage between the other region and the treatment region is impeded or obstructed by the first pressure medium flow restriction assembly during the at least one first period of time and so that the pressure medium flow in the first pressure medium guiding passage between the other region and the treatment region is not impeded or obstructed by the first pressure medium flow restriction assembly during the at least one second period of time, wherein the at least one first period of time and the at least one second period of time are alternating in sequence and contiguous so as to form the continuous period of time in which the at least one first period of time and the at least one second period of time are alternating; and controlling the second pressure medium flow restriction assembly so that the pressure medium flow in the second pressure medium guiding passage between the other region and the treatment region is not impeded or obstructed by the second pressure medium flow restriction assembly at least during the continuous period of time.

9. The method according to claim 1, wherein the furnace chamber comprises a furnace configured such that by controlling an electrical power input into the furnace, the pressure medium within the furnace chamber can be controllably heated by the furnace, and wherein the pressure medium heating device comprises or is constituted by the furnace, wherein the heating of the pressure medium in the treatment region based on the determined difference comprises controlling power input into the furnace based on the determined difference.

10. The method according to claim 1, wherein the treatment region is defined by a load compartment within the furnace chamber, and the furnace chamber is at least partly enclosed by a heat insulated casing and arranged so that pressure medium can enter and exit the furnace chamber, and wherein the furnace chamber comprises at least one pressure medium guiding passage at least in part formed between the heat insulated casing and the load compartment and being in fluid communication with the load compartment so as to form an inner convection loop, wherein pressure medium in the inner convection loop is guided through the load compartment and through the at least one pressure medium guiding passage of the furnace chamber and back to the load compartment, or vice versa, and wherein the pressure medium circulation flow generator is configured to selectively control a flow rate of pressure medium in the inner convection loop, and wherein the heating of the pressure medium in the treatment region based on the determined difference comprises:

controlling the flow rate of pressure medium in the inner convection loop based on the determined difference using the pressure medium circulation flow generator.

11. The method according to claim 2, further comprising:
obtaining at least one value indicative of at least one temperature in the pressure vessel;
based on the at least one value indicative of the at least one temperature in the pressure vessel, determining a value of a predefined temperature-related parameter of the pressure vessel, wherein the predefined temperature-related parameter of the pressure vessel is a function of the at least one value indicative of the at least one temperature in the pressure vessel; and
determining a difference between a selected value of the predefined temperature-related parameter of the pressure vessel and the determined value of the predefined temperature-related parameter of the pressure vessel,
wherein the controlling of the operating rate of the pressure medium circulation flow generator, the controlling of the pressure medium supplying rate of the pressure medium supplying device and/or the heating of the pressure medium in the treatment region using the pressure medium heating device based on the determined difference between the required cooling power and the determined cooling power is or are further made based on the difference between the selected value of the predefined temperature-related parameter of the pressure vessel and the determined value of the predefined temperature-related parameter of the pressure vessel.

12. A pressing arrangement, comprising:
a pressure vessel configured to hold pressure medium therein during use of the pressing arrangement;
a furnace chamber within the pressure vessel, the furnace chamber configured to direct the pressure medium to enter and exit the furnace chamber, wherein a treatment region is at least in part defined by the furnace chamber, wherein the treatment region is configured to accommodate an article, and wherein the pressing arrangement is configured to subject the article to a treatment cycle including a cooling phase;
a pressure medium circulation flow generator configured to provide a circulation of the pressure medium within the pressure vessel, wherein the pressure medium passes through the furnace chamber during the circulation of the pressure medium, wherein the pressure medium circulation flow generator is controllable at least with respect to an operating rate thereof;
a pressure medium heating device configured to selectively and controllably heat the pressure medium within the pressure vessel to increase a temperature of the pressure medium in the treatment region;
at least one sensor configured to sense at least one temperature in the treatment region; and
at least one control and processing circuitry communicatively coupled with the at least one sensor, the pressure medium circulation flow generator, and the pressure medium heating device, the at least one control and processing circuitry configured to control operation of the pressure medium circulation flow generator and the pressure medium heating device, respectively, to control a rate of cooling of the pressure medium in the treatment region, the at least one control and processing circuitry configured to, during the cooling phase,
obtain values indicative of at least one temperature in the treatment region at a plurality of time instants;
based on the obtained values, determine a cooling power for cooling of the pressure medium in the treatment region;
determine a difference between a required cooling power required to obtain a selected value for the rate of cooling of the pressure medium in the treatment region and the determined cooling power;
based on the determined difference, control the operating rate of the pressure medium circulation flow generator so that a difference between the cooling power for cooling of the pressure medium in the treatment region and the required cooling power decreases; and
in response to a determination that the cooling power for cooling of the pressure medium in the treatment region provided by the operation of the pressure medium circulation flow generator exceeds a cooling power corresponding to the selected value for the rate of cooling of the pressure medium in the treatment region, heat the pressure medium in the treatment region using the pressure medium heating device and based on the determined difference so that the difference between the cooling power of cooling of the pressure medium in the treatment region and the required cooling power decreases.

13. The pressing arrangement according to claim 12, wherein the pressure medium circulation flow generator comprises a fan.

14. The pressing arrangement according to claim 12, further comprising:
a pressure medium supplying device configured to selectively and controllably transport pressure medium from another region in the pressing arrangement to the treatment region during at least part of the cooling phase, wherein a temperature of the pressure medium in the other region is lower than the temperature of the pressure medium in the treatment region during the at least part of the cooling phase, to decrease the temperature of the pressure medium in the treatment region by transport of pressure medium during the cooling phase from the other region to the treatment region, wherein the pressure medium supplying device is controllable at least with respect to pressure medium supplying rate;
wherein the at least one control and processing circuitry is further communicatively coupled with the pressure medium supplying device for controlling operation thereof, for controlling the rate of cooling of the pressure medium in the treatment region; and
wherein the at least one control and processing circuitry is further configured to, during the cooling phase,
in response to a determination that a maximally possible cooling power for cooling of the pressure medium in the treatment region provided by the operation of the pressure medium circulation flow generator is below a cooling power corresponding to the selected value for the rate of cooling of the pressure medium in the treatment region, control the pressure medium supplying rate of the pressure medium supplying device based on the determined difference so that the difference between the cooling power for cooling of the pressure medium in the treatment region and the required cooling power decreases.

15. The pressing arrangement according to claim 14, wherein the pressure medium supplying device comprises a pressure medium flow generator, the pressure medium flow generator comprising a fan.

16. The pressing arrangement according to claim 14, wherein the pressure medium supplying device comprises at least one pressure medium guiding passage within the pressure vessel, the at least one pressure medium guiding passage being arranged such that the other region is in fluid communication with the treatment region by means of the at least one pressure medium guiding passage, wherein the pressure medium supplying device is configured to selectively and controllably transport pressure medium from the other region to the treatment region via the at least one pressure medium guiding passage, and wherein the pressure medium supplying device further comprises pressure medium flow restriction means configured to selectively and controllably impede or obstruct pressure medium flow in the at least one pressure medium guiding passage, whereby pressure medium flow between the other region and the treatment region can be selectively impeded or obstructed or not impeded or obstructed by the pressure medium flow restriction means.

17. The pressing arrangement according to claim 16, wherein the at least one pressure medium guiding passage comprises at least one conduit, extending from the other region to or towards the treatment region, and one or more openings comprised in the at least one conduit, the one or more openings providing fluid communication between the other region and an interior of the at least one conduit, wherein pressure medium from the other region entering the interior of the at least one conduit can be transported to the treatment region via the at least one conduit, wherein the pressure medium flow restriction means are arranged at least in part in the one or more openings and are configured to selectively and controllably impede or obstruct pressure medium flow between the other region and the interior of the at least one conduit via the one or more openings.

18. The pressing arrangement according to claim 16, wherein the pressure medium flow restriction means comprise one or more adjustable throttles or one or more adjustable valves.

19. A control and processing circuitry configured to be communicatively coupled with a pressing arrangement, the pressing arrangement including a pressure vessel configured to hold pressure medium therein during use of the pressing arrangement, a furnace chamber within the pressure vessel, a pressure medium circulation flow generator, a pressure medium heating device, and at least one sensor, the furnace chamber configured to direct the pressure medium to enter and exit the furnace chamber, wherein a treatment region is at least in part defined by the furnace chamber, wherein the treatment region is configured to accommodate an article, and wherein the pressing arrangement is configured to subject the article to a treatment cycle including a cooling phase, the pressure medium circulation flow generator configured to provide a circulation of the pressure medium within the pressure vessel, wherein the pressure medium passes through the furnace chamber during the circulation of the pressure medium, wherein the pressure medium circulation flow generator is controllable at least with respect to an operating rate thereof, the pressure medium heating device configured to selectively and controllably heat the pressure medium within the pressure vessel to increase a temperature of the pressure medium in the treatment region, the at least one sensor configured to sense at least one temperature in the treatment region, the control and processing circuitry configured to be communicatively coupled with the at least one sensor of the pressing arrangement, the pressure medium circulation flow generator, and the pressure medium heating device, the control and processing circuitry configured to control operation of the pressure medium circulation flow generator and the pressure medium heating device, respectively, the control and processing circuitry configured to control a rate of cooling of the pressure medium in the treatment region, the control and processing circuitry configured to:
- obtain values indicative of at least one temperature in the treatment region at a plurality of time instants;
- based on the obtained values, determine a cooling power for cooling of the pressure medium in the treatment region;
- determine a difference between a required cooling power required to obtain a selected value for the rate of cooling of the pressure medium in the treatment region and the determined cooling power;
- based on the determined difference, control the operating rate of the pressure medium circulation flow generator so that a difference between the cooling power for cooling of the pressure medium in the treatment region and the required cooling power decreases; and
- in response to a determination that the cooling power for cooling of the pressure medium in the treatment region provided by the operation of the pressure medium circulation flow generator exceeds a cooling power corresponding to the selected value for the rate of cooling of the pressure medium in the treatment region, heat the pressure medium in the treatment region using the pressure medium heating device and based on the determined difference so that the difference between the cooling power of cooling of the pressure medium in the treatment region and the required cooling power decreases.

20. A non-transitory computer-readable storage medium storing a computer program product configured to, when executed in a control and processing circuitry, cause the control and processing circuitry to perform the method according to claim 1.

* * * * *